United States Patent
Kwon et al.

(10) Patent No.: US 12,308,424 B2
(45) Date of Patent: May 20, 2025

(54) ELECTRODE, LITHIUM BATTERY INCLUDING THE SAME, AND METHOD OF MANUFACTURING THE SAME

(71) Applicant: Samsung SDI Co., Ltd., Yongin-si (KR)

(72) Inventors: Ilkyong Kwon, Yongin-si (KR); Hyun Nam, Yongin-si (KR); Donggeun Lee, Yongin-si (KR); Jinhyon Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 560 days.

(21) Appl. No.: 17/652,009

(22) Filed: Feb. 22, 2022

(65) Prior Publication Data

US 2022/0271276 A1 Aug. 25, 2022

(30) Foreign Application Priority Data

Feb. 22, 2021 (KR) .................. 10-2021-0023688

(51) Int. Cl.
| | |
|---|---|
| *H01M 4/36* | (2006.01) |
| *H01M 4/62* | (2006.01) |
| *H01M 10/0525* | (2010.01) |
| *H01M 10/0585* | (2010.01) |
| *H01M 4/02* | (2006.01) |

(52) U.S. Cl.
CPC .......... *H01M 4/366* (2013.01); *H01M 4/623* (2013.01); *H01M 4/625* (2013.01); *H01M 10/0525* (2013.01); *H01M 10/0585* (2013.01); *H01M 2004/021* (2013.01)

(58) Field of Classification Search
CPC ...... H01M 4/366; H01M 4/623; H01M 4/625; H01M 10/0525; H01M 10/0585; H01M 2004/021; H01M 4/13; H01M 4/0411; H01M 4/0435; H01M 4/139; H01M 10/052; H01M 4/131; H01M 4/1391; H01M 2300/0065; Y02E 60/10

See application file for complete search history.

(56) References Cited

U.S. PATENT DOCUMENTS

| | | |
|---|---|---|
| 2005/0266298 A1 | 12/2005 | Mitchell et al. |
| 2018/0212277 A1 | 7/2018 | Park et al. |
| 2019/0140254 A1 | 5/2019 | Kim et al. |
| 2019/0237748 A1 | 8/2019 | Shin et al. |
| 2020/0044257 A1 | 2/2020 | Koo et al. |
| 2020/0365881 A1* | 11/2020 | Tanaka .................. H01M 4/622 |
| 2021/0057728 A1* | 2/2021 | Song .................. H01M 4/0404 |
| 2022/0109143 A1 | 4/2022 | Seok et al. |
| 2022/0209220 A1 | 6/2022 | Lee et al. |

FOREIGN PATENT DOCUMENTS

| | | |
|---|---|---|
| JP | 2016-106346 A | 6/2016 |
| KR | 10-2006-0025230 A | 3/2006 |
| KR | 10-2017-0099748 A | 9/2017 |
| KR | 10-2018-0067428 A | 6/2018 |
| KR | 10-2018-0121411 A | 11/2018 |
| KR | 10-2020-0096153 A | 8/2020 |

OTHER PUBLICATIONS

Notice Of Allowance issued in corresponding KR Patent Application No. 10-2021-0023688, dated Dec. 20, 2024, 2pp.

* cited by examiner

*Primary Examiner* — Muhammad S Siddiquee

(74) *Attorney, Agent, or Firm* — Womble Bond Dickinson (US) LLP

(57) ABSTRACT

Provided are an electrode, a lithium battery including the same, and an electrode manufacturing method, the electrode including: an electrode active material layer including an electrode active material and a binder; and an electrode current collector on one surface or between two surfaces of the electrode active material layer, wherein the electrode active material layer includes: a first electrode active material layer including a first electrode active material and a first binder and contacting the electrode current collector; and a second electrode active material layer arranged on the first electrode active material layer and including a second electrode active material layer and a second binder.

19 Claims, 14 Drawing Sheets

ELECTRODE, LITHIUM BATTERY INCLUDING THE SAME, AND METHOD OF MANUFACTURING THE SAME

CROSS-REFERENCE TO RELATED APPLICATION

This application claims priority to and the benefit of Korean Patent Application No. 10-2021-0023688, filed on Feb. 22, 2021, in the Korean Intellectual Property Office, the entire content of which is hereby incorporated by reference.

BACKGROUND

1. Field

Embodiments of the present disclosure relate to an electrode, a lithium battery including the same, and a method of manufacturing the same.

2. Description of the Related Art

In accordance with the miniaturization and higher performance of various devices, higher densification of lithium batteries, in addition to miniaturization and weight reduction of lithium batteries, is becoming more important. In other words, high-capacity lithium batteries are becoming more important.

In order to implement a lithium battery suitable for the use described above, electrodes having high loading have been studied.

In an electrode having high loading, the distribution of components in the electrode is non-uniform and the density near the surface of the electrode is increased. Accordingly, the performance of a lithium battery using such an electrode deteriorates or is reduced.

There is a need for an electrode capable of preventing or reducing performance deterioration of a secondary battery.

SUMMARY

One or more embodiments of the present disclosure include a novel electrode having a uniform (e.g., substantially uniform) distribution of components therein, thereby preventing or reducing the performance deterioration of a battery.

One or more embodiments include a lithium battery including the electrode.

One or more embodiments include a method of manufacturing the electrode.

Additional aspects of embodiments will be set forth in part in the description which follows and, in part, will be apparent from the description, or may be learned by practice of the presented embodiments of the disclosure.

According to one or more embodiments, provided is an electrode including:
an electrode active material layer including an electrode active material and a binder; and
an electrode current collector on one surface or between two surfaces of the electrode active material layer; and
wherein the electrode active material layer includes: a first electrode active material layer contacting the electrode current collector and including a first electrode active material and a first binder; and a second electrode active material layer on the first electrode active material layer and including a second electrode active material material layer and a second binder,
wherein the first electrode active material layer has, as measured by a surface and interfacial cutting analysis system (SAICAS), a first ratio of change of vertical relative force ($F_{VR}$) between a first point, which is 5% away from a surface of the first electrode active material layer facing way from the electrode current collector, and a second point, which is 5% away from a surface of the electrode current collector with respect to a total thickness of the first electrode active material layer,
the second electrode active material layer has, as measured by the SAICAS, a second ratio of change of vertical relative force ($F_{VR}$) between a third point, which is 5% away from a surface of the second electrode active material layer facing away from the first electrode active material layer, and a fourth point, which is 5% away from the surface of the first electrode active material layer with respect to the total thickness of the second electrode active material layer, and
the first ratio of change of the first electrode active material layer is different from the second ratio of change of the second electrode active material layer, and the second ratio of change of the second electrode active material layer is 300% or less.

According to one or more embodiments, provided is an electrochemical battery including:
a cathode; an anode; and
an electrolyte between the cathode and the anode, wherein:
at least one selected from the cathode and the anode is the electrode described above.

According to one or more embodiments, provided is a method of manufacturing the electrode, the method including:
preparing a first composition by mixing a first electrode active material, a first binder, a conductive material, and a solvent;
preparing a second composition by dry-mixing a second electrode active material, a second binder, and a dry conductive material;
coating and drying the first composition on a surface of an electrode current collector to thereby provide a first electrode active material layer; and
providing a second composition on the first electrode active material layer to thereby provide a second electrode active material layer,
wherein the first electrode active material layer has, as measured by a surface and interfacial cutting analysis system (SAICAS), a first ratio of change of vertical relative force ($F_{VR}$) between a first point, which is 5% away from a surface of the first electrode active material layer facing away from the electrode current collector, and a second point, which is 5% away from a surface of the electrode current collector with respect to a total thickness of first electrode active material layer,
the second electrode active material layer has, as measured by the SAICAS, a second ratio of change of vertical relative force ($F_{VR}$) between a third point, which is 5% away from a surface of the second electrode active material layer facing away from the first electrode active material layer, and a fourth point, which is 5% away from the surface of the first electrode active material layer with respect to the total thickness of the second electrode active material layer, and
the first ratio of change of the first electrode active material layer is different from the second ratio of change of the second electrode active material layer, and the second ratio of change of the second electrode active material layer is 300% or less.

BRIEF DESCRIPTION OF THE DRAWINGS

The above and other aspects and features of certain embodiments of the disclosure will be more apparent from the following description taken in conjunction with the accompanying drawings, in which.

DETAILED DESCRIPTION

Figure 1:
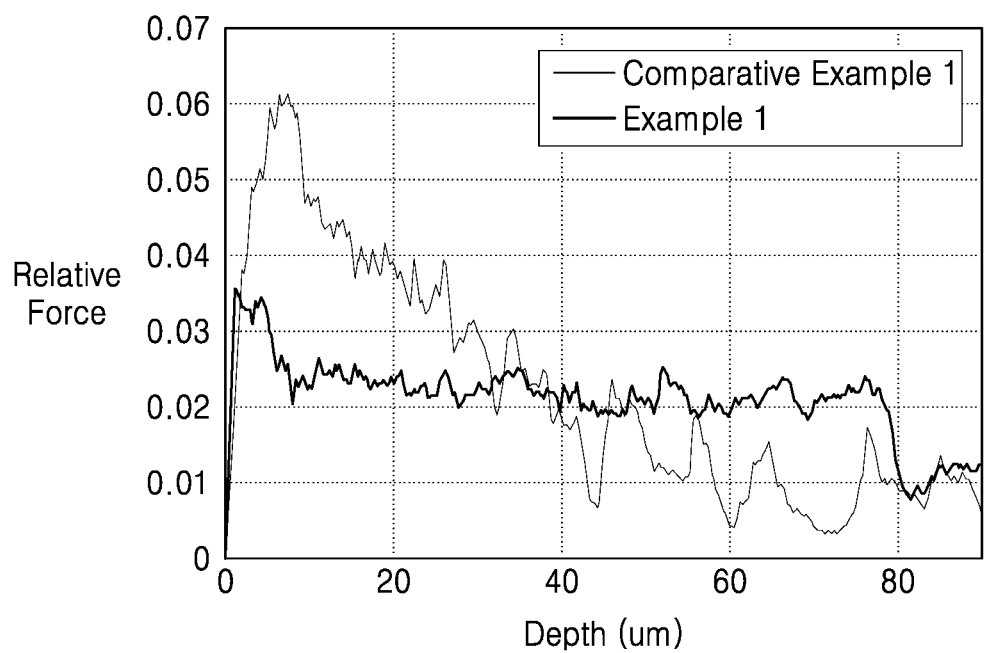
FIG. 1 shows graphs of analysis of cathodes manufactured in Example 1 and Comparative Example 1 using a surface and interfacial cutting analysis system (SAICAS)

Reference will now be made in more detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of embodiments of the present description. As used herein, the term "and/or" includes any and all combinations of one or more of the associated listed items. Expressions such as "at least one of," when preceding a list of elements, modify the entire list of elements and do not modify the individual elements of the list.

The subject matter of the present disclosure will now be described more fully with reference to the accompanying drawings, in which example embodiments are shown. The subject matter of the present disclosure may, however, be embodied in many different forms, and should not be construed as being limited to the embodiments set forth herein. Rather, these embodiments are provided so that this disclosure will be thorough and complete, and will fully convey the effects and features of the present disclosure and ways to implement the subject matter of the present disclosure to those skilled in the art. Accordingly, the subject matter of the present disclosure should be construed as including all modifications, equivalents, and alternatives within the scope of the present disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprise," "include," and/or "have," when used in this specification, specify the presence of stated features, integers, steps, operations, elements, and/or components, but do not preclude the presence or addition of one or more other features, integers, steps, operations, elements, components, and/or groups thereof. As used herein, the slash "/" or the term "and/or" includes any and all combinations of one or more of the associated listed items.

In the drawings, the size or thickness of each layer, region, or element may be arbitrarily exaggerated or reduced for better understanding or ease of description, and thus the present disclosure is not limited thereto. Throughout the written description and drawings, like reference numbers and labels will be used to denote like or similar elements. Throughout the specification, it will be understood that when an element such as a layer, a film, a region, or a plate is referred to as being "on" another element, it can be "directly on" the element, or intervening elements, layers, regions, and/or the like may also be present. Throughout the specification, while the terms "first", "second", etc., may be used herein to describe various constituent elements, these components should not be limited by these terms. These terms are used only to distinguish one component from another, not for purposes of limitation.

Hereinafter, embodiments of an electrode, a lithium battery including the same, and a method of manufacturing the same will be described in more detail.

According to an embodiment, an electrode includes: an electrode active material layer including an electrode active material and a binder; and an electrode current collector on one surface or between two surfaces of the electrode active material layer, wherein the electrode active material layer includes: a first electrode active material layer including a first electrode active material and a first binder and contacting the electrode current collector; and a second electrode active material layer on the first electrode active material layer and including a second electrode active material layer and a second binder, wherein the first electrode active material layer has, as measured by a surface and interfacial cutting analysis system (SAICAS), a first ratio of change of vertical relative force ($F_{VR}$) between a first point, which is 5% away (a first distance 5% away) from a surface of the first electrode active material layer facing way from the electrode current collector, and a second point, which is 5% away (a second distance 5% away) from the surface of the electrode current collector with respect to a total thickness of the first electrode active material layer, the second electrode active material layer has, as measured by the SAICAS, a second ratio of change of vertical relative force ($F_{VR}$) between a third point, which is 5% away (a third distance 5% away) from a surface of the second electrode active material layer facing away from the first electrode active material layer, and a fourth point, which is 5% away (a fourth distance 5% away) from the surface of the first electrode active material layer with respect to a total thickness of the second electrode active material layer, and the first ratio of change of the first electrode active material differs from the second ratio of change of the second electrode active material layer, and the second ratio of change of the second electrode active material layer is 300% or less. Thus, according to embodiments of the present disclosure, the first distance and the second distance may each be measured relative to the total thickness of the first electrode active material layer, and the third distance and the fourth distance may each be measured relative to the total thickness of the second electrode active material layer.

In the electrode, because the first ratio of change of the first electrode active material layer has a different value from that of the second ratio of change of the second electrode active material layer, the first electrode active material layer and the second electrode active material layer may play different roles. For example, the second electrode active material layer may have excellent uniformity of the distribution of components in the electrode. Accordingly, local increases in electrode mixture density on the surface of the second electrode active material layer are suppressed or reduced, and thus, liquid electrolyte may be more easily impregnated into the electrode. In addition, because a side reaction and an increase in internal resistance due to non-uniform distribution of components in the second electrode active material layer are suppressed or reduced, the reversibility of electrode reaction may be improved. In addition, the first electrode active material layer may provide excellent binding strength with respect to the electrode current collector. Accordingly, even after charging and discharging for a long period, separation of the electrode active material layer from the electrode active material layer may be suppressed or reduced. As a result, a lithium battery including the cathode may have improved lifespan characteristics and high-rate capability.

The first ratio of change and the second ratio of change of vertical relative force are calculated by Equation 1. For a measurement method using the SAICAS, for example, Evaluation Example 1 may be referred to.

Ratio of change of vertical relative force $(F_{VR})$=
[(Maximum value of vertical relative force−Minimum value of vertical relative force)/Minimum value of vertical relative force]×100     Equation 1

A second ratio of change of vertical relative force of the second electrode active material layer may be, for example, 300% or less, 250% or less, or 200% or less. The second ratio of change of vertical relative force of the second electrode active material layer may be, for example, about 10% to about 300%, about 50% to about 300%, about 100% to about 300%, about 100% to about 250%, about 100% to about 200%, or about 150% to about 200%.

A first ratio of change of vertical relative force of the first electrode active material layer may be, for example, 300% or less, 250% or less, or 200% or less. The first ratio of change of vertical relative force of the first electrode active material layer may be, for example, about 10% to about 300%, about 50% to about 300%, about 100% to about 300%, about 100% to about 250%, about 100% to about 200%, about 120% to about 180%, about 130% to about 170%, or about 140% to about 160%.

In the electrode, the first electrode active material layer has, as measured by the SAICAS, a first mean value of vertical relative force $(F_{VR})$ between the first point, which is 5% away (the first distance 5% away) from the surface of the first electrode active material layer facing away from the electrode current collector, and the second point, which is 5% away (the second distance 5% away) from the surface of the electrode current collector with respect to the total thickness of the first electrode active material layer, and the second electrode active material layer has, as measured by the SAICAS, a second mean value of vertical relative force $(F_{VR})$ between the third point, which is 5% away (the third distance 5% away) from the surface of the second electrode active material layer facing away from the first electrode active material layer, and the fourth point, which is 5% away (the fourth distance 5% away) from the surface of the first electrode active material layer with respect to the total thickness of the second electrode active material layer, and the first mean value of the first electrode active material layer may be smaller than the second mean value of the second electrode active material layer. For example, the first mean value of the first electrode active material layer is an arithmetic mean value of vertical relative forces $(F_{VR})$ of the first electrode active material layer between the first point and the second point. For example, the second mean value of the second electrode active material layer is an arithmetic mean value of vertical relative forces $(F_{VR})$ between the third point and the fourth point. For example, referring to FIG. 1, the second mean value of the second electrode active material layer is about 0.020 to about 0.023, and the first mean value of the first electrode active material layer is about 0.010 to about 0.013. A difference between the second mean value of the second electrode active material layer and the first mean value of the first electrode active material layer may be, for example, 0.01 or less, 0.008 or less, or 0.006 or less.

In the electrode according to embodiments, as measured by a SAICAS, a horizontal force ratio of a second horizontal force $(F_{HA2})$ at a second point (a sixth point) of the second electrode active material layer to a first horizontal force of $(F_{HA1})$ at a first point (a fifth point) is 50% or greater, wherein the first point, which is 10% away (a fifth distance 10% away) from one surface of the second electrode active material layer (e.g., the surface of the second electrode active material layer) facing away from the other surface of the second electrode active material layer (e.g., the interface between the first electrode active material layer and the second electrode active material layer), and the second point, which is 10% away (a sixth distance 10% away) from the other surface of the second electrode active material layer (e.g., the interface between the first electrode active material layer and the second electrode active material layer) with respect to the total thickness of the second electrode active material layer. The horizontal force ratio may be, for example, about 50% to about 100%, about 60% to about 100%, about 70% to about 100%, about 80% to about 100%, or about 90% to about 100%. For example, the horizontal force ratio is represented by Equation 2.

Horizontal force ratio=[Second horizontal force $(F_{H2})$/First horizontal force $(F_{H1})$]×100     Equation 2

In the electrode, because the horizontal force ratio is 50% or greater, as measured by the SAICAS, uniformity of the distribution of components in the second electrode active material layer may be further improved. Because the electrode includes the second electrode active material layer having a horizontal force ratio within this range, a lithium battery including the electrode may have further improved performance.

In the electrode according to embodiments, for example, a thickness of the first electrode active material layer may be about 1% to about 60% of the total thickness of the electrode active material layer, and a thickness of the second electrode active material layer may be about 40% to about 99% of the total thickness of the electrode active material layer. For example, the thickness of the first electrode active material layer may be about 1% to about 55%, about 1% to about 50%, about 1% to about 45%, about 1% to about 40%, about 1% to about 35%, about 1% to about 30%, about 1% to about 25%, about 1% to about 20%, about 1% to about 15%, about 1% to about 10%, about 1% to about 5%, or about 1% to about 3% of the total thickness of the electrode active material layer. For example, the thickness of the second electrode active material layer may be about 45% to about 99%, about 50% to about 99%, about 55% to about 99%, about 60% to about 99%, about 65% to about 99%, about 70% to about 99%, about 75% to about 99%, about 80% to about 99%, about 85% to about 99%, about 90% to about 99%, about 95% to about 99%, or about 97% to about 99% of the total thickness of the electrode active material layer. Because the first electrode active material layer and the second electrode active material layer of the electrode have a thickness ratio within these ranges, a lithium battery including the electrode may have further improved performance.

The total thickness of the electrode active material layer may be, for example, about 20 μm to about 200 μm, about 50 μm to about 150 μm, or about 80 μm to about 120 μm.

The thickness of the first electrode active material layer may be, for example, about 10 μm to about 100 μm, about 10 μm to about 80 μm, about 10 μm to about 60 μm, about 10 μm to about 40 μm, or about 10 μm to about 20 μm.

The thickness of the second electrode active material layer may be, for example, about 10 μm to about 100 μm, about 20 μm to about 100 μm, about 40 μm to about 100 μm, about 60 μm to about 100 μm, or about 80 μm to about 100 μm.

In the electrode according to embodiments, the first electrode active material layer may be, for example, a dried product of a composition including a process solvent. As used herein, the term "process solvent" refers to a solvent that is additionally added in a preparation process of the first electrode active material to dissolve, disperse, or mix components of the first electrode active material layer, and then is removed in a drying process. The first electrode active material layer may include, for example, a residual process solvent.

In the electrode according to embodiments, the first electrode active material layer and the second electrode active material layer may include a same electrode active material. For example, the first electrode active material and the second electrode active material may be a same electrode active material. For example, although the first electrode active material layer and the second electrode active material layer include a same electrode active material, the first electrode active material layer and the second electrode active material layer may have different uniformities of the distribution of the components. In other embodiments, the first electrode active material layer and the second electrode active material layer may include different electrode active materials, but the present disclosure is not limited thereto. For example, the first electrode active material and the second electrode active material may be a same electrode active material.

In the electrode according to embodiments, a porosity of the first electrode active material layer may be, for example, smaller than that of the second electrode active material layer. Because the second electrode active material layer constituting an electrode surface has a higher porosity compared to that of the first electrode active material layer adjacent to the electrode current collector, a liquid electrolyte may more easily permeate into the electrode, and thus, reversibility of the electrode reaction may be improved. Accordingly, a lithium battery using the electrode may have improved high-rate capability. For example, the second electrode active material layer may have a porosity of about 10% to about 50%. The porosity refers to a ratio of the volume of pores to the total volume of the electrode. The porosity may be calculated by, for example, subtracting the volume of components, which is obtained from the weights and theoretical densities of the components, from the total volume of the electrode. In other words, the porosity may be measured by a gas adsorption method. The porosity of the first electrode active material layer may be, for example, about 10% to about 95%, about 20% to about 95%, about 30% to about 95%, about 40% to about 95%, about 50% to about 95%, about 60% to about 95%, or about 70% to about 95% of the porosity of the second electrode active material layer.

The second binder included in the second electrode active material layer may be, for example, a dry binder. The dry binder is, for example, a binder that is not impregnated, dissolved, or dispersed in a solvent. The dry binder is, for example, a binder that does not include a solvent or is not in contact with a solvent. The dry binder may be, for example, a fibrillized binder. The fibrillized binder may act as a matrix that supports and binds the electrode active material and other components included in the electrode active material layer. It can be confirmed that the fibrillized binder has a fibrous shape, for example, from a scanning electron microscope image of a cross-section of the electrode. The fibrillized binder may have, for example, an aspect ratio of 10 or greater, 20 or greater, 50 or greater, or 100 or greater.

The dry binder may be, for example, polytetrafluoroethylene (PTFE), a polyvinylidene fluoride-hexapropylene (PVDF-HFP) copolymer, polyvinylidene fluoride (PVDF), polyvinyl alcohol, polyacrylonitrile, carboxymethylcellulose (CMC), starch, hydroxypropylcellulose, cellulose, polyvinylpyrrolidone, polyethylene, polypropylene, ethylene-propylene-diene polymer (EPDM), sulfonated-EPDM, styrene butadiene rubber (SBR), fluororubber, or a copolymer thereof. However, the dry binder is not limited thereto, and any suitable binder used in manufacturing a dry electrode may be used. The dry binder may include a fluorine-based binder. The fluorine-based binder may be, for example, polytetrafluoroethylene (PTFE), polyvinylidene-fluoride-hexapropylene (PVDF-HFP) copolymer, and/or polyvinylidene fluoride (PVDF). For example, the second binder may be different from the first binder. For example, the second binder may be the same as the first binder.

The amount of the dry binder included in the second electrode active material layer may be, for example, about 1 wt % to about 10 wt %, or about 1 wt % to about 5 wt %, based on the total weight of the second electrode active material layer. When the amount of the dry binder in the second electrode active material layer is within these ranges, the binding strength between the second electrode active material layer and the first electrode active material layer may be improved, and a lithium battery including the electrode may have further improved high-rate capability. When the amount of the dry binder is too low, the binding strength between the second electrode active material layer and the first electrode active material layer may be poor. When the amount of the dry binder is too high, the energy density of the second electrode active material layer may have reduced energy density and reduced porosity, and thus, high-rate capability of the lithium battery may be reduced.

The second electrode active material layer may further include, for example, a conductive material (an electrically conductive material). The conductive material may be, for example, a dry conductive material. The dry conductive material is, for example, a conductive material that is not impregnated, dissolved, or dispersed in a solvent. The dry conductive material is, for example, a conductive material that does not include a solvent or is not in contact with a solvent. The dry conductive material includes, for example, a carbonaceous conductive material. The carbonaceous conductive material may be carbon black, graphite fine particles, natural graphite, artificial graphite, acetylene black, ketjen black, carbon fiber, and/or carbon nanotubes, but is not limited thereto, and may be any suitable material that is used as a carbonaceous conductive material in the art.

The amount of the dry conductive material included in the second electrode active material layer may be, for example, about 1 wt % to about 10 wt %, or about 1 wt % to about 5 wt %, based on the total weight of the second electrode active material layer. When the amount of the dry conductive material in the second electrode active material layer is within these ranges, a lithium battery including the electrode may have further improved high-rate capability.

The second electrode active material layer may be, for example, a self-standing film. For example, the second electrode active material layer may maintain a film shape without a support. Accordingly, the second electrode active material layer may be prepared as a separate self-standing film, and then arranged on the first electrode active material layer. Because the second electrode active material layer is manufactured in a dry process, a process solvent that is intentionally added may not be included therein. For example, a residual process solvent may not be included. In some embodiments, an unintended trace of a solvent may remain in the second electrode active material layer, but the solvent is not a process solvent that is intentionally added. Thus, the second electrode active material layer is distinguished from the first electrode active material layer that is manufactured by mixing components for the first electrode active material layer with a process solvent and then removing some or all of the process solvent by drying.

A material constituting the electrode current collector may be any suitable material that does not react with lithium, for example, a material that does not form an alloy or compound with lithium and has conductivity (e.g., electrical conductivity). The electrode current collector may be, for example, a metal or an alloy. The electrode current collector may consist of, for example, indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof.

For example, the electrode current collector may have a form selected from a sheet, a foil, a film, a plate, a porous body, a mesoporous body, a through-hole containing body, a polygonal ring body, a mesh body, a foam, and a nonwoven body. However, the form of the electrode current collector is not limited to these forms and may be any suitable form used in the art.

The electrode current collector may have a reduced thickness compared to that of an electrode current collector included in an electrode of the related art. Accordingly, due to the inclusion of a thin-film current collector, the electrode according to an embodiment is distinguished from electrodes of the related art including a thick-film current collector. Because the electrode according to an embodiment includes a thin-film current collector having a reduced thickness, the thickness of the electrode active material layer is relatively increased in the electrode including the thin-film current collector. As a result, an energy density of a lithium battery including the electrode is increased. The thickness of the electrode current collector may be, for example, 15 µm or less. The thickness of the electrode current collector may be, for example, about 0.1 µm to about 15 µm.

The electrode current collector may have a reduced surface roughness compared to that of an electrode current collector included in an electrode of the related art. Because the electrode current collector surface has a reduced surface roughness, the electrode current collector may form a uniform (e.g., substantially uniform) interface with the electrode active material layer and/or a conductive layer. As a result, local side reactions and/or non-uniform electrode reactions at the interface between the electrode current collector and other layers are suppressed or reduced, and cycle characteristics of a lithium battery including the electrode are improved.

The electrode current collector may additionally include a conductive layer on a surface or two surfaces of the electrode current collector. The conductive layer may be included, for example, directly on one or two surfaces of the electrode current collector. Therefore, another layer may not be included between the electrode current collector and the conductive layer. Because the conductive layer is included directly on one or two surfaces of the electrode current collector, the binding strength between the electrode current collector and the electrode active material layer may be further improved. A thickness of the conductive layer may be, for example, about 0.01% to about 30%, about 0.1% to about 30%, about 0.5% to about 30%, about 1% to about 25%, about 1% to about 20%, about 1% to about 15%, about 1% to about 10%, about 1% to about 5%, or about 1% to about 3%. The thickness of the conductive layer may be, for example, about 10 nm to about 10 µm, about 50 nm to about 5 µm, or about 100 nm to about 1 µm. When the conductive layer has a thickness within these ranges, the binding strength between the electrode current collector and the electrode active material layer is further improved, and an increase in interfacial resistance is suppressed or reduced. The conductive layer may include, for example, a carbonaceous conductive material. The carbonaceous conductive material included in the conductive layer may be selected from carbonaceous conductive materials included in the electrode active material layer. The conductive layer may include a carbonaceous conductive material that is the same as that of the electrode active material layer. The conductive layer may include, for example, a binder. The conductive layer may include, for example, a carbonaceous conductive material and a binder. Due to the inclusion of the binder in the conductive layer, the binding strength between the electrode current collector and the electrode active material layer may be further improved. The binder included in the conductive layer may be selected from binders included in the electrode active material layer. The conductive layer may include a binder that is the same as that of the electrode active material layer. The binder included in the conductive binder may be, for example, a fluorine-based binder. The fluorine-based binder contained in the conductive layer may be, for example, polyvinylidene fluoride (PVDF). The conductive layer may be on the electrode current collector by, for example, a dry method or a wet method. The conductive layer may be on the electrode current collector in a dry manner by, for example, chemical vapor deposition (CVD), physical vapor deposition (PVD), and/or the like. The conductive layer may be on the electrode current collector in a wet manner, for example by spin coating, dip coating, and/or the like. The conductive layer may be on the electrode current collector by, for example, depositing a carbonaceous conductive material on the electrode current collector by deposition. The conductive layer formed by dry coating may include (or consist of) a carbonaceous conductive material and may not include a binder. In some embodiments, the conductive layer may be on the electrode current collector by, for example, coating and drying a composition including a carbonaceous conductive material a binder, and a solvent, on the surface of the electrode current collector.

The electrode may be, for example, a cathode. The cathode may include a cathode active material layer, and the cathode active material layer may include a cathode active material.

The cathode active material included in the cathode active material layer is lithium metal oxide, and any suitable lithium metal oxide that is generally used in the art may be used without limitation.

The cathode active material may be, for example, one or more composite oxides of a metal with lithium, the metal being selected from cobalt, manganese, nickel, and a combination thereof, and, for example, may be, for example, a compound represented by one of the following formulae: $Li_aA_{1-b}B_bD_2$ (wherein $0.90 \le a \le 1$ and $0 \le b \le 0.5$); $Li_aE_{1-b}B_bO_{2-c}D_c$ (wherein $0.90 \le a \le 1$, $0 \le b \le 0.5$, and $0 \le c \le 0.05$); $LiE_{2-b}B_bO_{4-c}D_c$ (wherein $0 \le b \le 0.5$, and $0 \le c \le 0.05$); $Li_aNi_{1-b-c}Co_bB_cD_\alpha$ (wherein $0.90 \le a \le 1$, $0 \le b \le 0.5$, $0 \le c \le 0.05$, and $0 < \alpha \le 2$); $Li_aNi_{1-b-c}Co_bB_cO_{2-\alpha}F_\alpha$ (wherein $0.90 \le a \le 1$, $0 \le b \le 0.5$, $0 \le c \le 0.05$, and $0 < \alpha < 2$); $Li_aNi_{1-b-c}Co_bB_cO_{2-\alpha}F_2$ (wherein $0.90 \le a \le 1$, $0 \le b \le 0.5$, $0 \le c \le 0.05$, and $0 < \alpha < 2$); $Li_aNi_{1-b-c}Mn_bB_cD_\alpha$ (wherein $0.90 \le a \le 1$, $0 \le b \le 0.5$, $0 \le c \le 0.05$, and $0 < \alpha \le 2$); $Li_aNi_{1-b-c}Mn_bB_cO_{2-\alpha}F_\alpha$ (wherein $0.90 \le a \le 1$, $0 \le b \le 0.5$, $0 \le c \le 0.05$, and $0 < \alpha < 2$); $Li_aNi_{1-b-c}Mn_bB_cO_{2-\alpha}F_2$ (wherein $0.90 \le a \le 1$, $0 \le b \le 0.5$, $0 \le c \le 0.05$, and $0 < \alpha < 2$); $Li_aNi_bE_cG_dO_2$ (wherein $0.90 \le a \le 1$, $0 \le b \le 0.9$, $0 \le c \le 0.5$, and $0.001 \le d \le 0.1$); $Li_aNi_bCo_cMn_dGeO_2$ (wherein $0.90 \le a \le 1$, $0 \le b \le 0.9$, $0 \le c \le 0.5$, $0 \le d \le 0.5$, and $0.001 \le e \le 0.1$); $Li_aNiG_bO_2$ (wherein $0.90 \le a \le 1$, and $0.001 \le b \le 0.1$); $Li_aCoG_bO_2$ (wherein $0.90 \le a\ 1$, and $0.001 \le b \le 0.1$); $Li_aMnG_bO_2$ (wherein $0.90 \le a \le 1$, and $0.001 \le b \le 0.1$); $Li_aMn_2GbO_4$ (wherein $0.90 \le a \le 1$, and $0.001 \le b \le 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (wherein $0 \le f \le 2$); $Li_{(3-f)}Fe_2(PO_4)_3$ (wherein $0 \le f \le 2$); and $LiFePO_4$.

In the formulae of the compounds described above, A may be Ni, Co, Mn, or a combination thereof; B may be Al, Ni, Co, Mn, Cr, Fe, Mg, Sr, V, a rare-earth element, or a combination thereof; D may be O, F, S, P, or a combination thereof; E may be Co, Mn, or a combination thereof; F may be F, S, P, or a combination thereof; G may be Al, Cr, Mn, Fe, Mg, La, Ce, Sr, V, or a combination thereof; Q may be Ti, Mo, Mn, or a combination thereof; I may be Cr, V, Fe, Sc, Y, or a combination thereof; and J may be V, Cr, Mn, Co, Ni, Cu, or a combination thereof.

The compounds described above may have a coating layer added onto the surface thereof, and such compounds having a coating layer may be used. A mixture of the compounds described above without a coating layer and compounds having a coating layer may be used. The coating layer added onto the surface of the compounds listed above may include, for example, a coating element compound, such as an oxide of the coating element, a hydroxide of the coating element, an oxyhydroxide of the coating element, an oxycarbonate of the coating element, or a hydroxycarbonate of the coating element. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. A method for forming the coating layer may be selected within a range not (or substantially not) adversely affecting the physical or chemical properties of the cathode active material. For example, the coating layer may be formed using a coating method, for example, a spray coating or dipping. The coating methods may be well understood by a person of ordinary skill in the art, and thus, duplicative descriptions thereof will not be repeated here.

The cathode active material may be, for example, a composite cathode active material.

The composite cathode active material includes, for example, a core including a lithium transition metal oxide and a shell provided along the surface of the core, wherein the shell includes: at least one first metal oxide represented by $M_aO_b$ (wherein $0 < a \le 3$, $0 < b < 4$, and b is not an integer when a is 1, 2, or 3); and graphene, wherein the first metal oxide is in a graphene matrix, M is at least one metal selected from Groups 2 to 13, 15 and 16 of the periodic table of the elements, and the lithium transition metal oxide includes nickel, and the amount of nickel is 80 mol % or more based on the total molar number of the transition metal. A shell including a first metal oxide and graphene is on the core of the composite cathode active material.

In the related art, it is difficult to coat a core with graphene, because the graphene agglomerates. In contrast, the composite cathode active material of the present disclosure uses a composite including a plurality of first metal oxides in a graphene matrix. Accordingly, the agglomeration of graphene is prevented or reduced and a uniform (e.g., substantially uniform) shell may be on the core. Accordingly, contact between the core and the liquid electrolyte may be effectively blocked or reduced, and thus, side reactions due to the contact between the core and the liquid electrolyte are prevented or reduced. In addition, the reduction of nickel ions ($Ni^{3+} \rightarrow Ni^{2+}$) and cation mixing, due to the liquid electrolyte, are suppressed or reduced, and thus, the creation of a resistance layer such as a NiO phase may be suppressed or reduced. Furthermore, the release of nickel ions is also suppressed or reduced. The shell containing graphene has flexibility, and thus, easily can withstand a volume change of the composite cathode active material during charging and discharging, thereby suppressing or reducing occurrence of cracks inside the composite cathode active material. Due to graphene having high electronic conductivity, the interfacial resistance between the composite cathode active material and liquid electrolyte is reduced. Accordingly, despite the introduction of the shell including graphene, the internal resistance of the lithium battery is maintained or reduced. In addition, because the first metal oxide has voltage resistance, deterioration of the lithium transition metal oxide included in the core may be prevented or reduced during charging and discharging at high voltage. As a result, the cycle characteristics and high temperature stability of a lithium battery containing the composite cathode active material may be improved. The shell may include, for example, one first metal oxide, or two or more different first metal oxides. In addition, while the lithium transition metal oxide included in the composite cathode active material has a high nickel amount of 80 mol % or more with respect to the total molar number of transition metal, high discharge capacity and cycle characteristics may be provided concurrently (e.g., simultaneously), due to the arrangement of the shell containing the first metal oxide and graphene on the core. Therefore, the composite cathode active material having a high nickel amount of 80 mol % or more may provide improved capacity compared to a composite cathode active material having a relatively low nickel amount, and may still provide excellent lifespan characteristics. The metal included in the first metal oxide may be, for example, at least one selected from Al, Nb, Mg, Sc, Ti, Zr, V, W, Mn, Fe, Co, Pd, Cu, Ag, Zn, Sb, and Se.

The first metal oxide may be, for example, one or more selected from $Al_2O_z$ ($0<z<3$), $NbO_x$ ($0<x<2.5$), $MgO_x$ ($0<x<1$), $Sc_2O_z$ ($0<z<3$), $TiO_y$ ($0<y<2$), $ZrO_y$ ($0<y<2$), $V_2O_z$ ($0<z<3$), $WO_y$ ($0<y<2$), $MnO_y$ ($0<y<2$), $Fe_2O_z$ ($0<z<3$), $Co_3O_w$ (0<w<4), $PdO_x$ (0<x<1), $CuO_x$ (0<x<1), AgO (0<x<1), ZnO (0<x<1), $Sb_2O_z$ (0<z<3), and $SeO_y$ (0<y<2). Because the first metal oxide is in the graphene matrix, the uniformity of the shell on the core is improved, and the voltage resistance of the composite cathode active material is further improved. For example, the shell includes, as the first metal oxide, $Al_2O_x$ (0<x<3). The shell may further include one or more second metal oxides represented by $M_aO_c$ (0<a≤3, 0<c≤4, and c is an integer when a is 1, 2, or 3). M is at least one metal selected from Groups 2 to 13, 15 and 16 of the periodic table of the elements. For example, the second metal oxide includes the same metal as in the first metal oxide, and c/a, which is a ratio of a and c of the second metal oxide, has a larger value than b/a, which is a ratio of a and b of the first metal oxide. For example, c/a>b/a. The second metal oxide may be, for example, selected from $Al_2O_3$, NbO, $NbO_2$, $Nb_2O_5$, MgO, $Sc_2O_3$, $TiO_2$, $ZrO_2$, $V_2O_3$, $WO_2$, $MnO_2$, $Fe_2O_3$, $Co_3O_4$, PdO, CuO, AgO, ZnO, $Sb_2O_3$, and $SeO_2$. The first metal oxide is a product of reduction of the second metal oxide. The first metal oxide may be obtained by the reduction of some or all of the second metal oxide. Therefore, the first metal oxide has a smaller oxygen amount and a higher metal oxidation number than the second metal oxide. For example, the shell includes $Al_2O_x$ (0<x<3) as the first metal oxide, and $Al_2O_3$ as the second metal oxide. In the composite cathode active material, for example, graphene contained in the shell and the transition metal of lithium transition metal oxide contained in the core may be chemically bound through a chemical bond. The carbon atom (C) of graphene contained in the shell and the transition metal (Me) of the lithium transition metal oxide are chemically bound to each other through a C—O-Me bond (for example, a C—O—Ni bond) via an oxygen atom. Due to the chemical binding of graphene contained in the shell, and the lithium transition metal oxide contained in the core, the core and the shell form a composite through a chemical bond. Accordingly, this composite structure is distinguished from a simple physical mixture of graphene and lithium transition metal oxide. In addition, the first metal oxide and graphene included in the shell are also chemically bound through a chemical bond. Here, the chemical bond may be a covalent bond or an ionic bond. The covalent bond may be a bond including at least one of an ester group, an ether group, a carbonyl group, an amide group, a carbonate anhydride group, and an acid anhydride group. The ionic bond may be a bond containing a carboxylate ion, an ammonium ion, or an acyl cation group. A thickness of the shell may be, for example, about 1 nm to about 5 μm, about 1 nm to about 1 μm, about 1 nm to about 500 nm, about 1 nm to about 200 nm, about 1 nm to about 100 nm, about 1 nm to about 90 nm, about 1 nm to about 80 nm, about 1 nm to about 70 nm, about 1 nm to about 60 nm, about 1 nm to about 50 nm, about 1 nm to about 40 nm, about 1 nm to about 30 nm, about 1 nm to about 20 nm, or about 1 nm to about 10 nm. Due to the shell having a thickness within these ranges, an increase in internal resistance of a lithium battery including the composite cathode active material is suppressed or reduced.

The amount of the composite included in the composite cathode active material may be 3 wt % or less, 2 wt % or less, 1 wt % or less, 0.5 wt % or less, 0.2 wt % or less, based on the total weight of the composite cathode active material. The amount of the composite may be about 0.01 wt % to about 3 wt %, about 0.01 wt % to about 1 wt %, about 0.01 wt % to about 0.7 wt %, about 0.01 wt % to about 0.6 wt %, about 0.1 wt % to about 0.5 wt %, about 0.01 wt % to about 0.2 wt %, about 0.01 wt % to about 0.1 wt %, or about 0.03 wt % to about 0.07 wt %, based on the total weight of the composite cathode active material. Due to the inclusion of the composite within these amount ranges in the composite cathode active material, the cycle characteristics of a lithium battery including the composite cathode active material are further improved. The average particle diameter of one or more selected from the first metal oxide and the second metal oxide included in the composite may be about 1 nm to about 1 μm, about 1 nm to about 500 nm, about 1 nm to about 200 nm, about 1 nm to about 100 nm, about 1 nm to about 70 nm, about 1 nm to about 50 nm, about 1 nm to about 30 nm, about 3 nm to about 30 nm, about 3 nm to about 25 nm, about 5 nm to about 25 nm, about 5 nm to about 20 nm, or about 7 nm to about 20 nm. Due to having such particle diameters in the nanometer range, the first metal oxide and/or the second metal oxide may be more uniformly distributed in the graphene matrix of the composite. Therefore, the composite may be uniformly (e.g., substantially uniformly) coated on the core without agglomeration and form a shell. In addition, due to having particle sizes within these ranges, the first metal oxide and/or the second metal oxide may be more uniformly on the core. Accordingly, because the first metal oxide and/or the second metal oxide are uniformly (e.g., substantially uniformly) on the core, voltage resistance characteristics may be more effectively exhibited. The average particle diameters of the first metal oxide and the second metal oxide may be measured by a measurement device using, for example, laser diffraction and/or dynamic light scattering. The average particle diameter is measured by using, for example, a laser scattering particle size distribution meter (for example, Horiba Corporation LA-920), and is a value of the median particle diameter (D50) at 50% by volume in a cumulative particle size distribution from the smallest to largest particles.

The core included in the composite cathode active material may include, for example, a lithium transition metal oxide represented by Formula 1:

$$Li_aNi_xCO_yM_zO_{2-b}A_b \qquad \text{Formula 1}$$

wherein, in Formula 1, 1.0≤a≤1.2, 0≤b≤0.2, 0.8≤x<1, 0<y≤0.3, 0<z≤0.3, x+y+z=1, M is at least one selected from manganese (Mn), niobium (Nb), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), and boron (B), and A is F, S, Cl, Br, or a combination thereof.

The core included in the composite cathode active material may include, for example, at least one of lithium transition metal oxides represented by Formula 2 to 6.

$$LiNi_xCo_yMn_zO_2 \qquad \text{Formula 2}$$

$$LiNi_xCo_yAl_zO_2 \qquad \text{Formula 3}$$

In Formulae 2 and 3, 0.8≤x≤0.95, 0<y≤0.2, 0<z≤0.2, and x+y+z=1.

$$LiNi_xCo_yAl_vMn_wO_2 \qquad \text{Formula 4}$$

In Formula 4, 0.8≤x≤0.95, 0<y≤0.2, 0<v≤0.2, 0<w≤0.2, and x+y+v+w=1.

$$Li_aM1_xM2_yPO_{4-b}X_b \qquad \text{Formula 5}$$

In Formula 5, 0.90≤a≤1.1, 0≤x≤0.9, 0≤y≤0.5, 0.9<x+y<1.1, 0≤b≤2,

M1 may be chromium (Cr), manganese (Mn), iron (Fe), cobalt (Co), nickel (Ni), copper (Cu), zirconium (Zr) or a combination thereof, M2 may be magnesium (Mg), calcium (Ca), strontium (Sr), barium (Ba), titanium (Ti), zinc (Zn), boron (B), niobium (Nb), gallium (Ga), indium (In), molybdenum (Mo), tungsten (W), aluminum (Al), silicon (Si), chromium (Cr), vanadium (V), scandium (Sc), yttrium (Y), or a combination thereof, and X may be 0, F, S, P, or a combination thereof.

Formula 6

In Formula 6, $0.90 \leq a \leq 1.1$, $0.9 \leq z \leq 1.1$, and

M3 may be chromium (Cr), manganese (Mn), iron (Fe), cobalt (Co), nickel (Ni), copper (Cu), zirconium (Zr), or a combination thereof.

In other embodiments, the electrode may be, for example, an anode. The anode may include an anode active material layer, and the anode active material layer may include an anode active material.

The anode active material may be any suitable material that used as an anode active material of a lithium battery in the art. For example, the anode active material may include at least one selected from lithium metal, a metal alloyable with lithium, a transition metal oxide, a non-transition metal oxide, and a carbonaceous material. The metal alloyable with lithium may be: for example, Si, Sn, Al, Ge, Pb, Bi, Sb, or a Si—Y alloy (where Y is an alkali metal, alkaline earth metal, a Group 13 element, a Group 14 element, a transition metal, a rare-earth element, or a combination element thereof, and is not Si); or a Sn—Y alloy (where Y is an alkali metal, an alkaline earth metal, a Group 13 element, a Group 14 element, a transition metal, a rare-earth element, or a combination element thereof, and is not Sn). The element Y is, for example, Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, TI, Ge, P, As, Sb, Bi, S, Se, Te, Po, or a combination thereof. The transition metal oxide is, for example, lithium titanium oxide, vanadium oxide, or lithium vanadium oxide. The non-transition metal oxide is, for example, $SnO_2$ or $SiO_x$ (wherein $0<x<2$). The carbonaceous material is, for example, crystalline carbon, amorphous carbon, or a mixture thereof. The crystalline carbon may be, for example, graphite, such as natural graphite and/or artificial graphite in an amorphous form, a plate-like form, a flake-like form, or a spherical or fibrous form. The amorphous carbon may be, for example, soft carbon (low-temperature calcined carbon) or hard carbon, mesophase pitch carbide, calcined coke, and/or the like.

Figure 3:
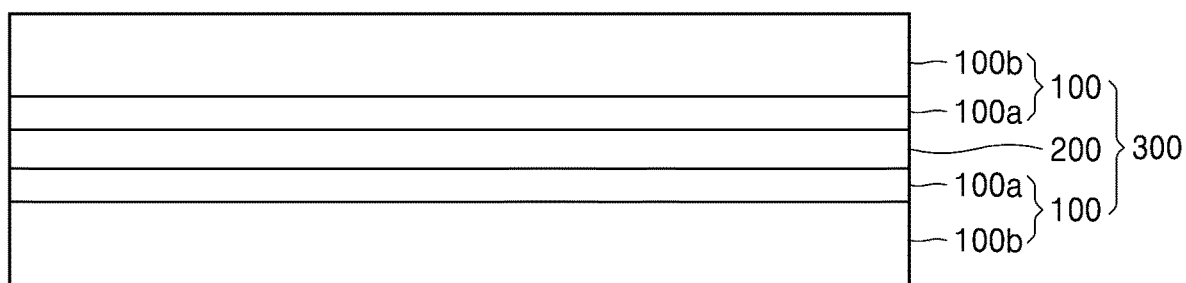
FIG. 3 is a cross-sectional view of an electrode according to an embodiment.

Referring to FIG. 3, an electrode 300 according to an embodiment may include: an electrode active material layer 100 including an electrode active material and a binder; and an electrode current collector 200 arranged on two surfaces of the electrode active material layer 100. The electrode active material layer 100 may include: a first electrode active material layer 100a including a first electrode active material layer and a binder; and a second electrode active material layer 100b including a second electrode active material layer and a binder. The first electrode active material and the second electrode active material may be the same or different from each other. The first electrode active material and the second electrode active material may each independently be selected, for example, from lithium transition metal oxides represented by Formulae 1 to 4. The electrode current collector 200 may be arranged only on part of the electrode active material layer 100.

Figure 4:
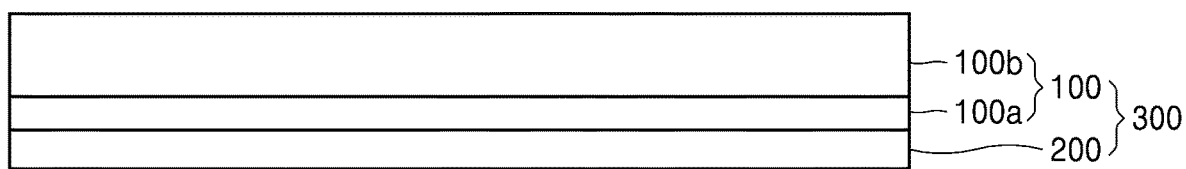
FIG. 4 is a cross-sectional view of an electrode according to an embodiment.

Referring to FIG. 4, an electrode 300 according to an embodiment may include: an electrode active material layer 100 including an electrode active material and a binder; and an electrode current collector 200 arranged on one surface of the electrode active material layer 100. The electrode active material layer 100 may include: a first electrode active material layer 100a including a first electrode active material layer and a first binder; and a second electrode active material layer 100b including a second electrode active material layer and a second binder. The first electrode active material and the second electrode active material may each independently be selected, for example, from lithium transition metal oxides represented by Formulae 1 to 4. The electrode current collector 200 may be arranged only on part of the electrode active material layer 100.

Figure 5:
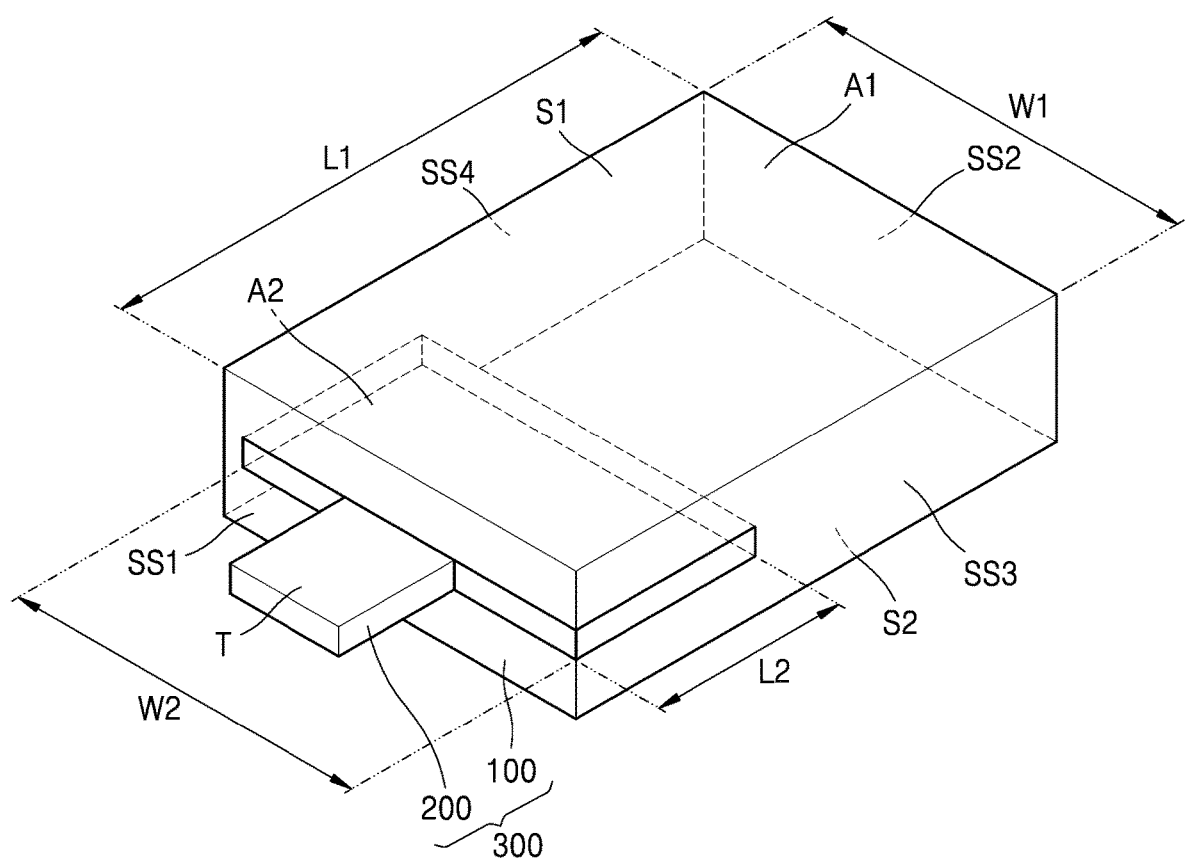
FIG. 5 is a perspective schematic view of an electrode according to an embodiment.
Figure 9:
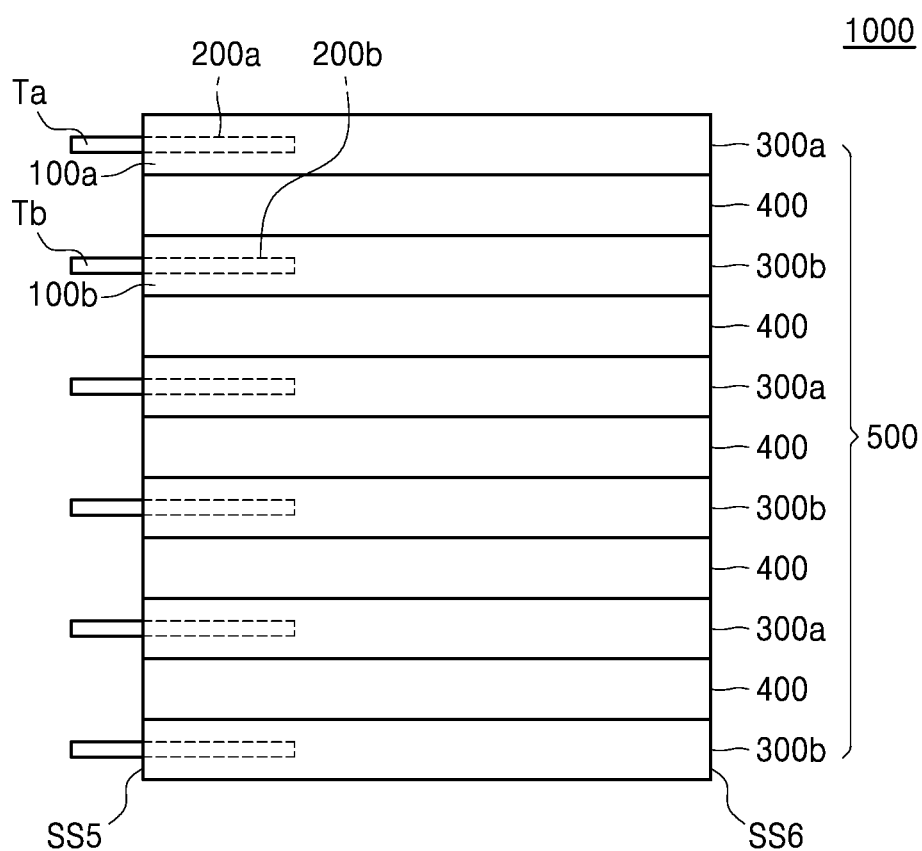
FIG. 9 is a side view of an electrode assembly according to an embodiment.

Referring to FIGS. 5 and 9, in the electrode 300 according to an embodiment, the electrode active material layer 100 includes: a first surface S1 and a second surface S2 that is opposite to the first surface S1; a first side surface SS1 connected to or coupled to ends in the length direction of the first surface S1 and the second surface S2, and a second side surface SS2 that is opposite to the first side surface SS1; and a third side surface SS3 connected to or coupled to ends of the first surface S1 and the second surface S2 in the width directions thereof, and a fourth side surface SS4 that is opposite to the third side surface SS3. The electrode active material layer 100 has a first area A1 defined by a first lengthwise distance L1 and a first widthwise distance W1, the electrode current collector 200 is between the first surface S1 and the second surface S2, and the electrode current collector 200 has a second area A2 defined by a second lengthwise distance L2 and a second widthwise distance W2, wherein the second area A2 of the electrode current collector 200 is less than 100% of the first area A1 of the electrode active material layer 100. For example, the second area A2 of the electrode current collector 200 may be about 10% to about 90%, about 10% to about 80%, about 10% to about 70%, about 10% to about 60%, about 10% to about 50%, about 10% to about 40%, about 10% to about 30%, or about 10% to about 20%, of the first area A1 of the electrode active material layer 100.

Because the area of the electrode current collector 200 in the electrode 300 is smaller than that of the electrode active material layer 100, the energy density of a lithium battery 1000 including the electrode 300 may be improved.

Referring to FIGS. 5 and 9, the second lengthwise distance L2 of the electrode current collector 200 may be less than 100% of the first lengthwise distance L1 of the electrode active material layer 100. For example, the second lengthwise distance L2 of the electrode current collector 200 may be about 10% to about 90%, about 10% to about 80%, about 10% to about 70%, about 10% to about 60%, about 10% to about 50%, about 10% to about 40%, about 10% to about 30%, or about 10% to about 20% of the first lengthwise distance L1 of the electrode active material layer 100. In other embodiments, the second widthwise distance W2 of the electrode current collector 200 may be less than 100% of the first widthwise distance W1 of the electrode active material layer 100. For example, the second widthwise distance W2 of the electrode current collector 200 may be about 10% to about 90%, about 10% to about 80%, about 10% to about 70%, about 10% to about 60%, about 10% to about 50%, about 10% to about 40%, about 10% to about 30%, or about 10% to about 20% of the first widthwise distance W1 of the electrode active material layer 100. For example, the second lengthwise distance L2 of the electrode current collector 200 may be less than 100% of the first lengthwise distance L1 of the electrode active material layer 100, and the second widthwise distance W2 of the electrode current collector 200 may be less than 100% of the first widthwise distance W1 of the electrode active material layer 100. As the electrode current collector 200 has such a size, the energy density of the lithium battery 1000 including the electrode 300 may be improved.

Referring to FIGS. 5 and 9, the electrode current collector 200 may be exposed through three or fewer side surfaces selected from among the first side surface SS1, the second side surface SS2, the third side surface SS3, and the fourth side surface SS4 of the electrode active material layer 100. As the electrode current collector 200 has a smaller area than that of the electrode active material layer 100, the electrode current collector 200 may be exposed through some of the side surfaces of the electrode active material layer 100, for example, three side surfaces, two side surfaces, or one side surface thereof. As the number of the side surfaces of the electrode active material layer 100 through which the electrode current collector 200 is exposed is reduced, the possibility of a short circuit through the side surface of the electrode active material layer 100 may be reduced, and thus, the safety of the lithium battery 1000 may be improved.

Referring to FIG. 5, the electrode current collector 200 may further include a tab T extending to the outside of the electrode active material layer 100 through at least two side surfaces selected from the first side surface SS1, the second side surface SS2, the third side surface SS3, and the fourth side surface SS4. For example, the tab T extends to the outside of the electrode active material layer 100 through the first side surface SS1 and/or the second side surface SS2. In some embodiments, the tab T extends to the outside of the electrode active material layer 100 through the third side surface SS3 and/or the fourth side surface SS4. As the tab T extends to the outside of the electrode active material layer 100 through one side surface or two opposing side surfaces of the electrode active material layer 100, a short circuit through a plurality of adjacent tabs T may be prevented, or a likelihood or occurrence of such a short circuit may be reduced.

In some embodiments, the electrode active material layer 100 may have a multilayer structure. For example, the electrode active material layer 100 may include a first electrode active material layer and a second electrode active material layer, or may include a first electrode active material layer, a second electrode active material layer, and a third electrode active material layer.

Referring to FIGS. 6A to 6E, the electrode current collector 200 may have various suitable shapes and may be at various suitable positions in the electrode active material layer 100.

Figure 6A:
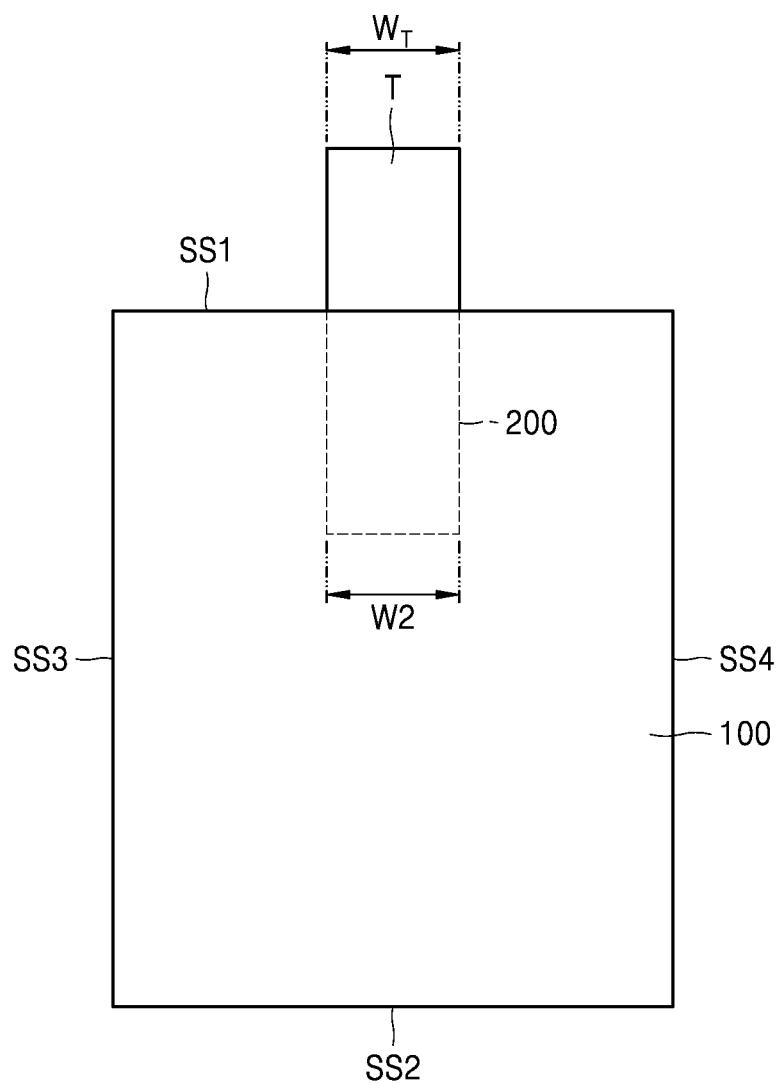
FIGS. 6A to 6F are plan views of electrodes according to embodiments.

Referring to FIG. 6A, the electrode current collector 200 is exposed through the first side surface SS1 of the electrode active material layer 100, and includes a tab T extending to the outside of the electrode active material layer 100 through the first side surface SS1. The widthwise distance WT of the tab T may be 100% of the second widthwise distance W2 of the electrode current collector 200.

Figure 6B:
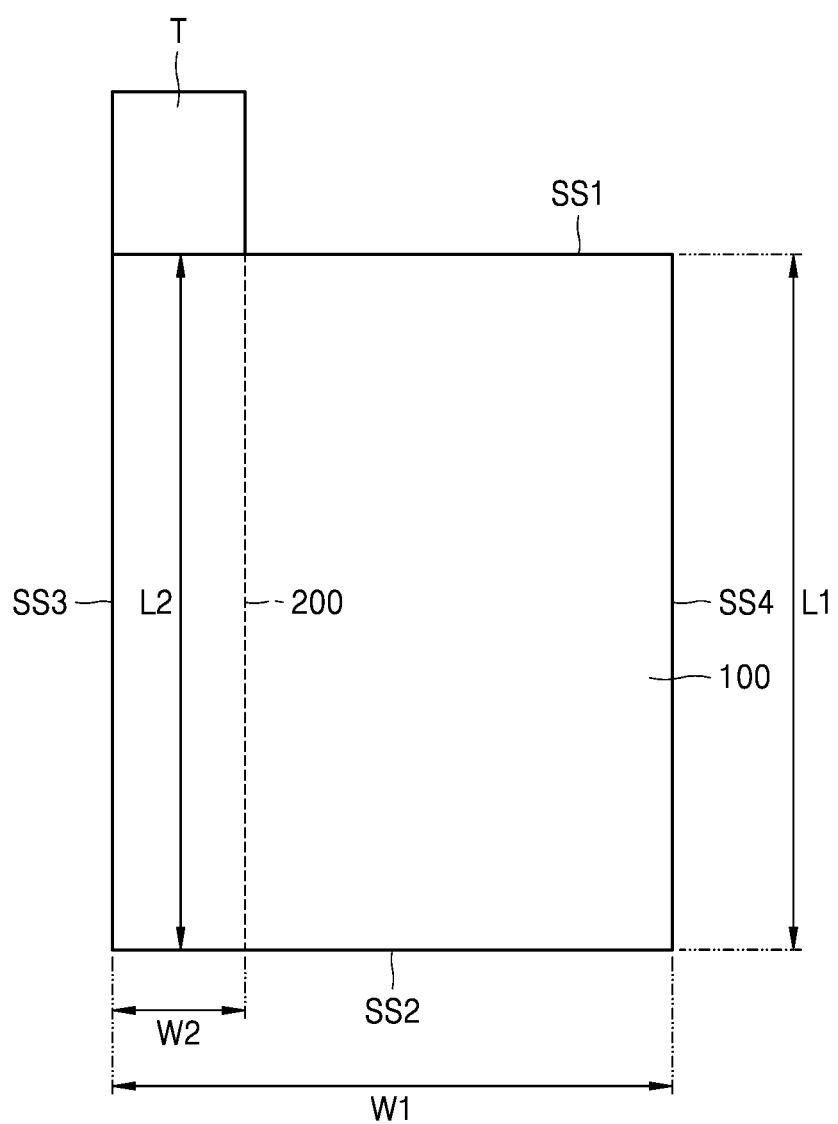

Referring to FIG. 6B, the electrode current collector 200 is exposed through the first side surface SS1, the second side surface SS2, and the third side surface SS3 of the electrode active material layer 100, and includes the tab T extending to the outside of the electrode active material layer 100 through the first side surface SS1. The second lengthwise distance L2 of the electrode current collector 200 may be 100% of the first lengthwise distance L1 of the electrode active material layer 100. The second widthwise distance W2 of the electrode current collector 200 may be less than 100% of the first widthwise distance W1 of the electrode active material layer 100.

Figure 6C:
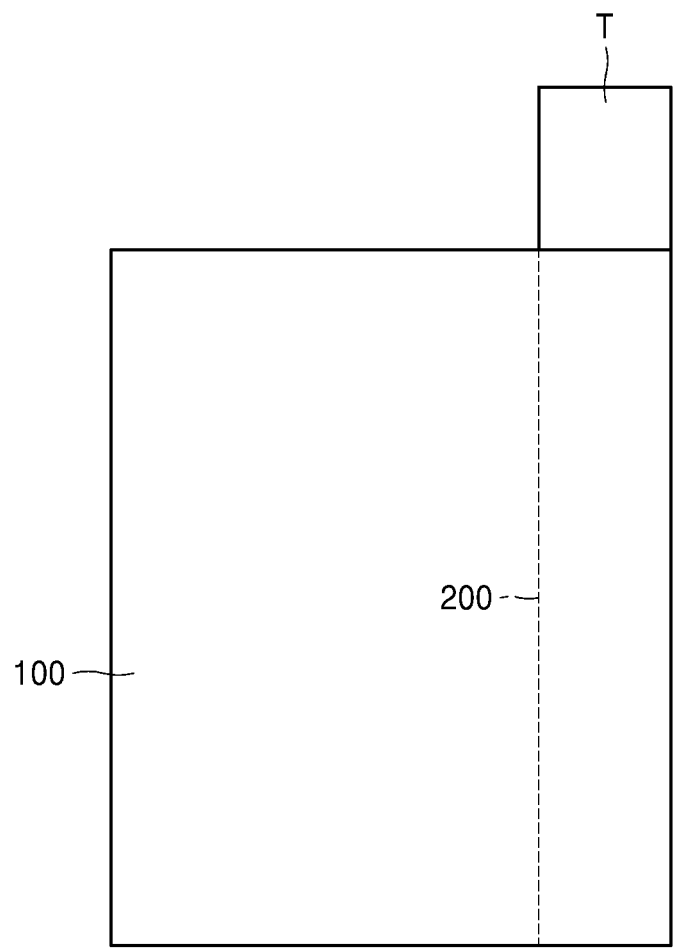

Referring to FIG. 6C, the electrode current collector 200 is exposed through the first side surface SS1, the second side surface SS2, and the fourth side surface SS4 of the electrode active material layer 100, and includes the tab T extending to the outside of the electrode active material layer 100 through the first side surface SS1.

Figure 6D:
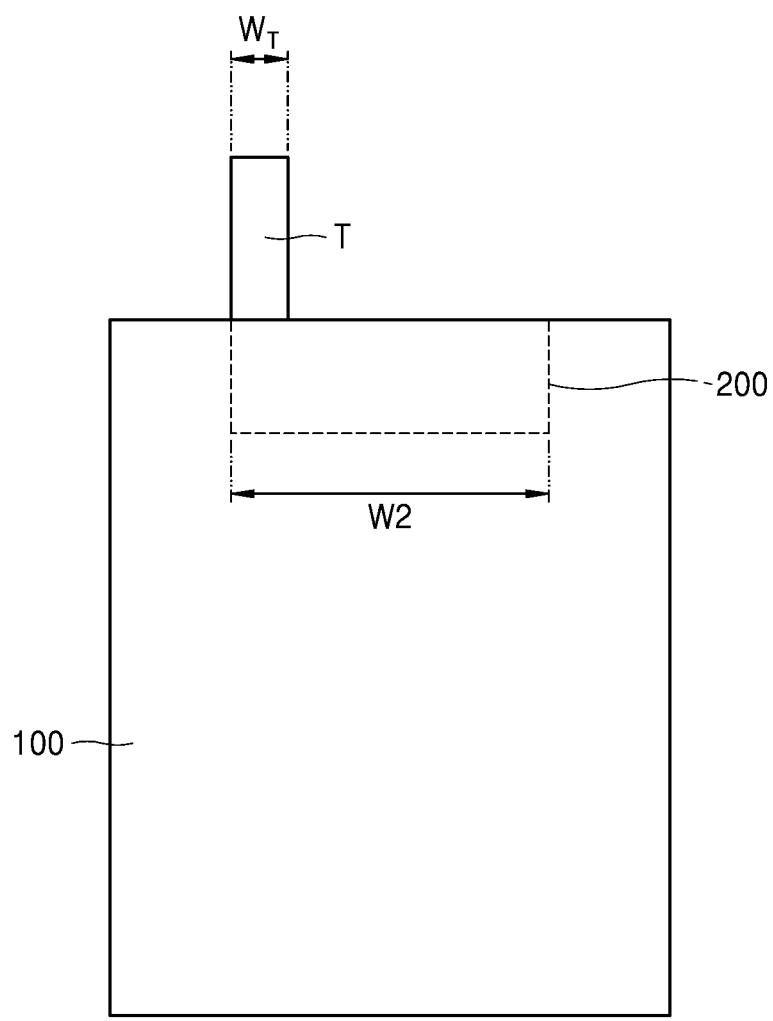

Referring to FIG. 6D, the electrode current collector 200 is exposed through the first side surface SS1 of the electrode active material layer 100, and includes a tab T extending to the outside of the electrode active material layer 100 through the first side surface SS1. The widthwise distance WT of the tab T may be less than 100% of the second widthwise distance W2 of the electrode current collector 200.

Figure 6E:
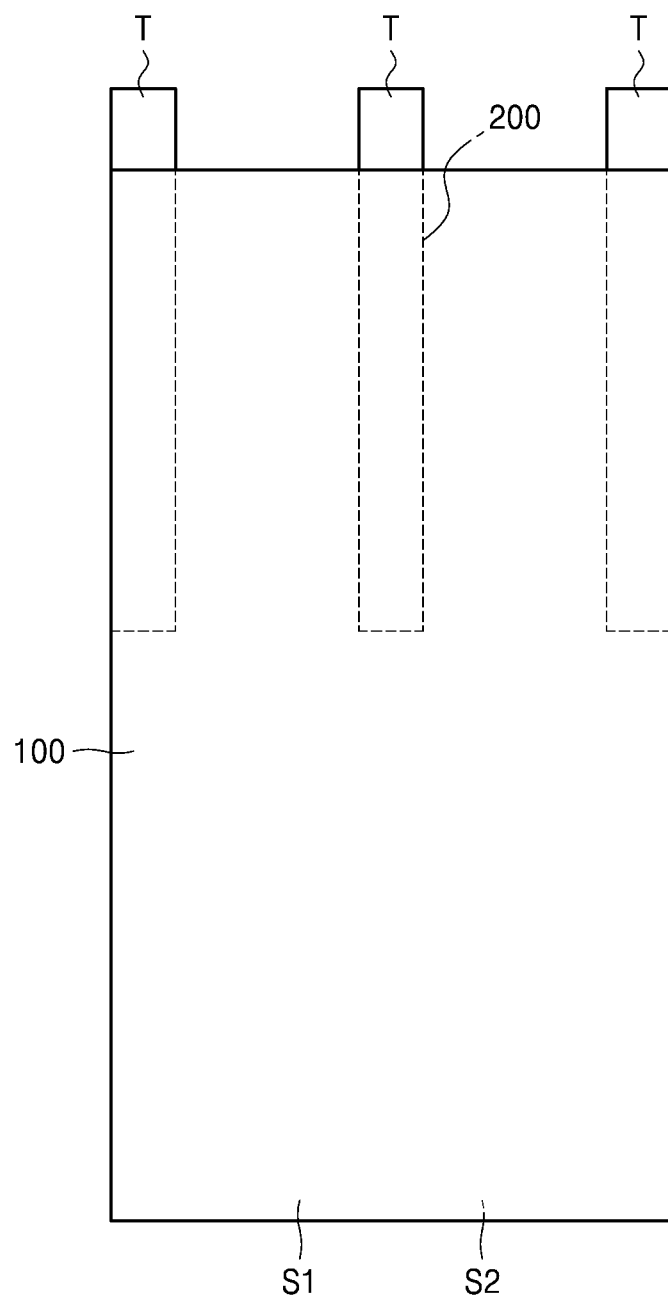
Figure 6F:
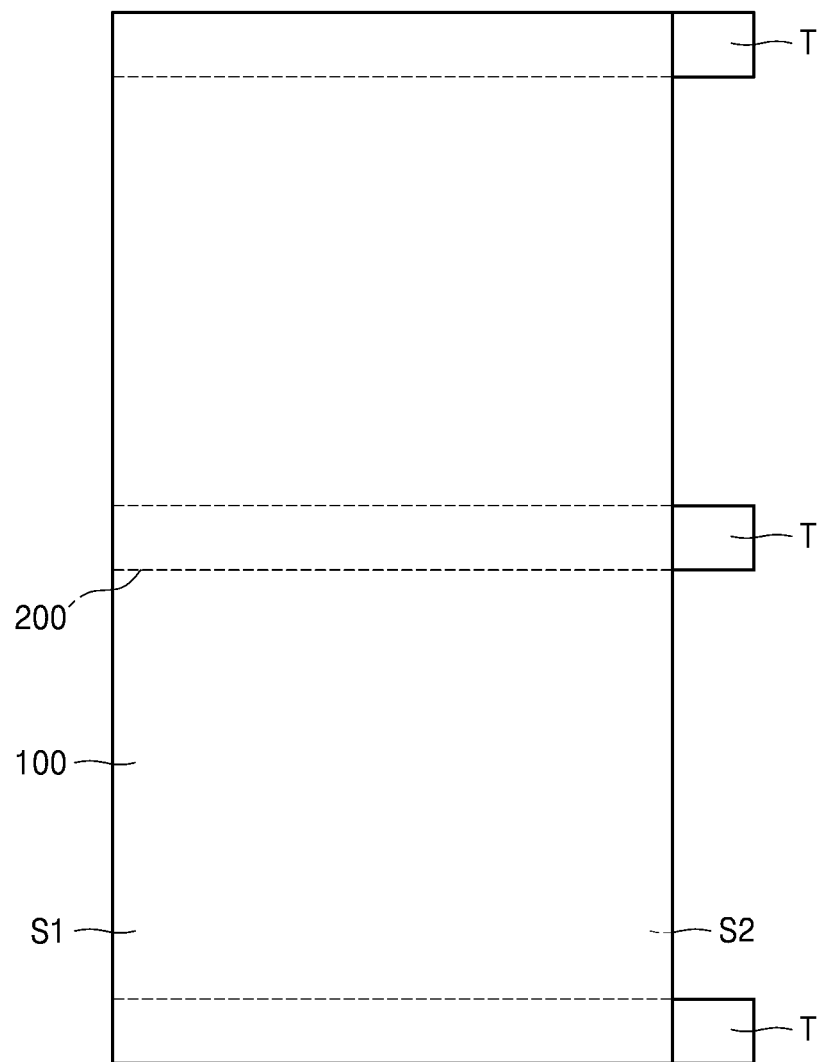

Referring to FIGS. 6E and 6F, included are a plurality of electrode current collectors 200 arranged spaced apart from each other in the length direction or width direction of the electrode active material layer 100. For example, the plurality of current collectors 200 may be spaced apart at equal intervals or different intervals. The plurality of electrode current collector 200 may have an angle of 45 degrees or less, 40 degrees or less, 30 degrees or less, 25 degrees or less, 20 degrees or less, 15 degrees or less, 10 degrees or less, or 5 degrees or less, with respect to one surface of the electrode active material layer 100, for example, at least one of the first surface S1 and the second surface S2. For example, the plurality of current collectors 200 may have an angle of 0 degree with respect to one surface of the electrode active material layer 100, e.g., may be arranged parallel (e.g., substantially parallel) to the electrode active material layer 100. For example, the plurality of electrode current collectors 200 may be between the first surface S1 and the second surface S2 of the electrode active material layer 100.

Figure 7:
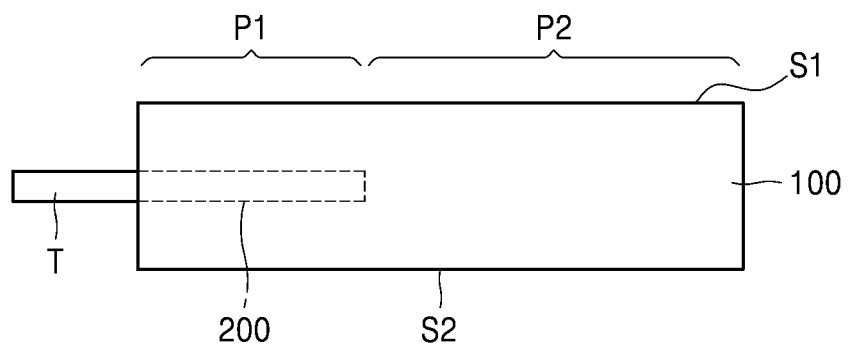
FIG. 7 is a cross-sectional view of an electrode according to an embodiment.

Referring to FIG. 7, the electrode active material layer 100 includes: a first region P1 in which the electrode current collector 200 is located between the first surface S1 and the second surface S2; and a second region P2 in which the electrode current collector 200 is not located between the first surface S1 and the second surface S2, wherein the mixture density of the second region P2 is different from the mixture density of the first region P1. For example, the mixture density of the second region P2 may be less than 100% of the mixture density of the first region P1. For example, the mixture density of the second region P2 may be about 50% to about 99.9%, about 60% to about 99%, about 70% to about 99%, about 80% to about 99%, about 80% to about 98%, about 80% to about 97%, about 80% to about 96%, or about 80% to about 95% of the mixture density of the first region P1.

According to another aspect of embodiments of the present disclosure, a lithium battery includes a cathode, an anode, and an electrolyte arranged between the cathode and the anode, wherein at least one of the cathode and the anode is the electrode described above.

Figure 8:
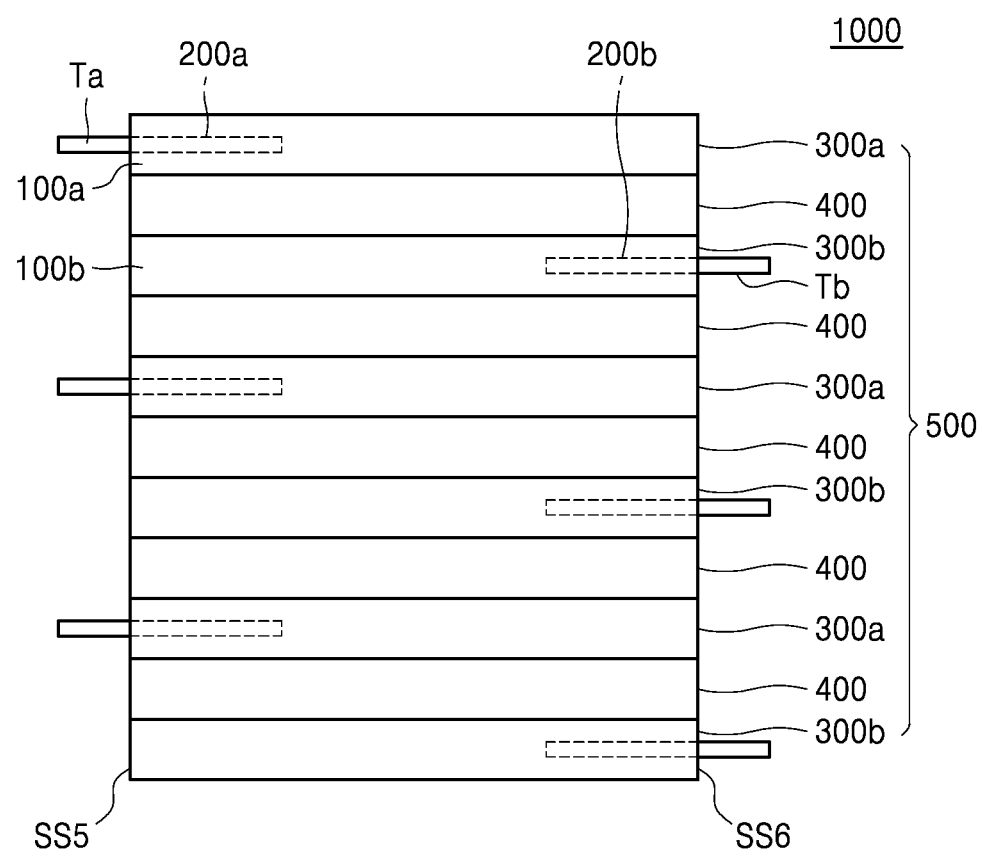
FIG. 8 is a side view of an electrode assembly according to an embodiment.
Figure 10:
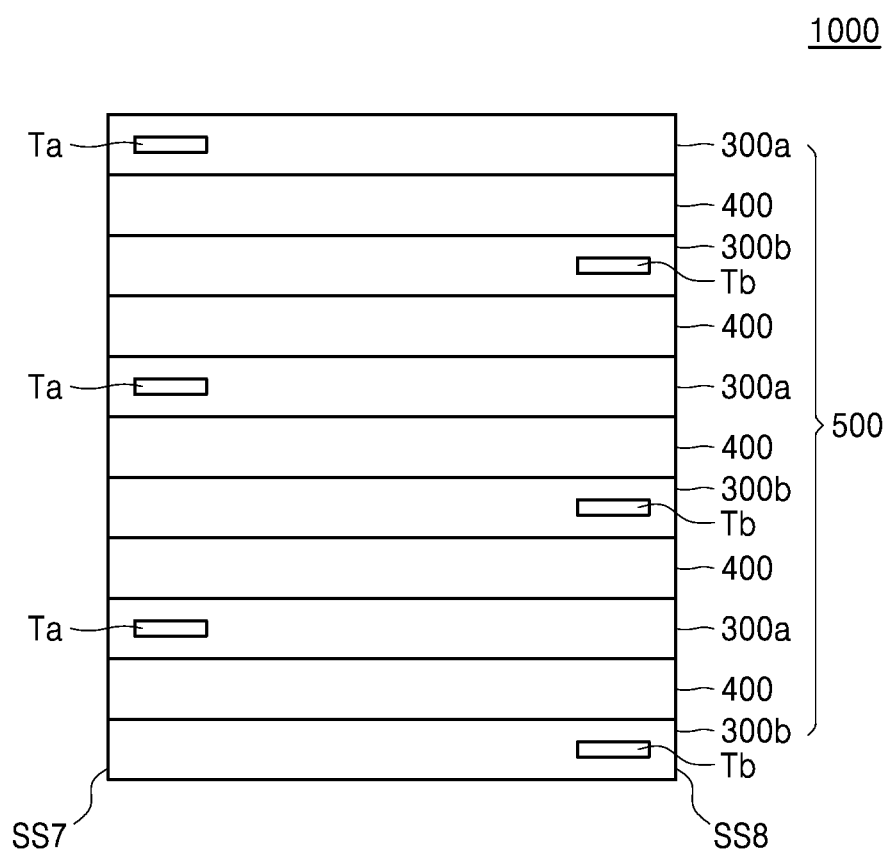
FIG. 10 is a front view of an electrode assembly according to an embodiment.

Referring to FIGS. 8 to 10, a lithium battery 1000 includes a cathode 300a, an anode 300b, and an electrolyte 400 between the cathode 300a and the anode 300b, wherein at least one of the cathode 300a and the anode 300b is the electrode described above.

Referring to FIG. 8, an electrode assembly 500 includes a plurality of cathodes 300a stacked along the thickness direction thereof, a plurality of anodes 300b each located between neighboring cathodes 300a, and a plurality of electrolytes 400, each between the cathodes 300a and the anodes 300b. The cathode 300a includes a cathode current collector 200a, the cathode current collector 200a includes a cathode tab Ta extending to the outside of the cathode active material layer 100a through one side surface SS5 of the electrode assembly 500, and the anode 300b includes an anode current collector 200b, and the anode current collector 200b includes an anode tab Tb extending to the outside of the anode active material layer 100b through another side surface SS6 that is opposite to the one side surface SS5 of the electrode assembly 500. The lithium battery 1000 includes the electrode assembly 500. Because the cathode tab Ta and the anode tab Tb are on the sides that are oppose to each other, the possibility of a short circuit therebetween is reduced.

Referring to FIG. 9, an electrode assembly 500 includes a plurality of cathodes 300a stacked along a thickness direction, a plurality of anodes 300b each located between neighboring cathodes 300a, and a plurality of electrolytes 400, each between the cathodes 300a and the anodes 300b. The cathode 300a includes a cathode current collector 200a, the cathode current collector 200a includes a cathode tab Ta extending to the outside of the cathode active material layer 100a through one side surface SS5 of the electrode assembly 500, the anode 300b includes an anode current collector 200b, and the anode current collector 200b includes an anode tab Tb extending to the outside of the anode active material layer 100b through the one side surface SS5 of the electrode assembly 500. The lithium battery 1000 includes the electrode assembly 500.

Referring to FIG. 10, on the one side surface of the electrode assembly 500, a plurality of cathode tabs Ta are spaced apart at constant (e.g., substantially constant) intervals in the thickness direction, and a plurality of anode tabs Tb are spaced apart at constant (e.g., substantially constant) intervals in the thickness direction. The plurality of cathode tabs Ta are adjacent to one side surface SS7 of the electrode assembly 500 in the width direction thereof, and the plurality of anode tabs Tb are adjacent to the other side surface SS8 of the electrode assembly 500 in the width direction thereof. FIG. 10 is a front view of the one side surface SS5 in FIG. 10. The lithium battery 1000 includes the electrode assembly 500.

Although the cathode tab Ta and the anode tab Tb are on the same side, because they are spaced apart from each other in the width direction, the possibility of a short circuit therebetween is reduced.

The lithium battery 1000 may be, for example, a lithium ion battery, a lithium solid battery, a lithium air battery, and/or the like.

According to another embodiment, provided is an electrode manufacturing method.

The electrode manufacturing method includes: preparing a first composition by mixing a first electrode active material, a first binder, a conductive material, and a solvent; preparing a second composition by dry-mixing a second electrode active material, and a dry conductive agent; coating and drying the first composition on a surface of an electrode current collector to thereby provide a first electrode active material layer; and providing the second composition on the first coating layer to thereby provide a second electrode active material layer, wherein the first electrode active material layer has, as measured by a surface and interfacial cutting analysis system (SAICAS), a first ratio of change of vertical relative force ($F_{VR}$) between a first point, which is 5% away (a first distance 5% away) from a surface of the first electrode active material layer facing away from the electrode current collector, and a second point, which is 5% away (a second distance 5% away) from a surface of the electrode current collector with respect to a total thickness of first electrode active material layer, the second electrode active material layer has, as measured by the SAICAS, a second ratio of change of vertical relative force ($F_{VR}$) between a third point, which is 5% away (a third distance 5% away) from a surface of the second electrode active material layer facing away from the first electrode active material layer, and a fourth point, which is 5% away (a fourth distance 5% away) from the surface of the first electrode active material layer with respect to the total thickness of the second electrode active material layer, and the first ratio of change of the first electrode active material differs from the second ratio of change of the second electrode active material layer, and the second ratio of change of the second electrode active material layer is 300% or less. An electrode manufactured by the manufacturing method may have a component distribution with improved uniformity, the binding strength between the electrode active material layer and the electrode current collector is improved, and thus, a lithium battery using the electrode may have further improved performance.

First, the first composition is prepared by mixing a first electrode active material layer, a first binder, a conductive material, and a solvent.

The first composition may be, for example, an electrode slurry. The solvent may be a process solvent. The process solvent may be, for example, a solvent used in the preparation of electrode slurry. The process solvent may be, for example, water, NMP, and/or the like, but is not limited thereto, and any suitable process solvent that is used in the preparation of electrode slurry may be used. A method of preparing the first composition may be any suitable method used in the art as a preparation method for an electrode slurry. The first binder and the conductive agent included in the first composition may be selected from second binders and conductive materials that are used in the preparation of the second composition.

In addition, the second composition is prepared by dry-mixing a second electrode active material layer, a second binder, and a conductive material.

The dry mixing refers to mixing without a process solvent. The dry mixing may be performed at a temperature of about 25° C. to about 65° C. The dry mixing may be performed using a stirrer, for example, at a rotation speed of about 10 rpm to about 10000 rpm, or about 100 rpm to about 10000 rpm. The dry mixing may be performed using a stirrer, for example, for about 1 min to about 200 min, or about 1 min to about 150 min.

The dry mixing may be performed, for example, one or more times. First, a first mixture may be prepared by first dry-mixing of an electrode active material, a dry conductive material, and a dry binder. The first dry mixing may be performed at a temperature of about 25° C. to about 65° C. at a rotation speed of about 2000 rpm or less for about 15 minutes or less. The first dry mixing may be performed at a temperature of about 25° C. to about 65° C. at a rotation speed of about 500 rpm to about 2000 rpm for about 5 min to about 15 min. Through the first dry mixing, the electrode active material, the dry conductive material and the dry binder may be uniformly (e.g., substantially uniformly) mixed. Subsequently, a second mixture may be prepared by second dry-mixing of an electrode active material, a dry conductive material, and a dry binder. The second dry mixing may be performed at a temperature of about 25° C. to about 65° C. at a rotation speed of about 4000 rpm or more for about 10 min or more. The second dry mixing may be performed at a temperature of about 25° C. to about 65° C. at a rotation speed of about 4000 rpm to about 9000 rpm for about 10 min to about 60 min. Through the second dry mixing, a dry mixture including a fibrillated (fibrillized) dry binder may be obtained.

The stirrer may be, for example, a kneader. The stirrer may include: a chamber; at least one rotary shaft that rotates inside the chamber; and a blade rotatably coupled to the rotary shaft and in the lengthwise direction of the rotary shaft. The blade may be, for example, one or more selected from a ribbon blade, a sigma blade, a jet (Z) blade, a dispersion blade, and a screw blade. Due to the inclusion of the blade, the electrode active material, the dry conductive material, and the dry binder may be effectively mixed without a solvent, to prepare a dough-like mixture. The prepared mixture may be introduced into an extrusion device and extruded in the form of a sheet. The pressure during the extrusion may be, for example, about 4 MPa to about 100 MPa, or about 10 MPa to about 90 MPa. The obtained mixture may be in the form of a sheet. For example, the obtained mixture may be the second composition.

As the dry conductive material, carbon black, graphite fine particles, natural graphite, artificial graphite, acetylene black, ketjen black, carbon fiber; carbon nanotubes; metal powder, metal fiber and/or metal tube of copper, nickel, aluminum, and/or silver; and/or a conductive polymer such as polyphenylene derivatives may be used. However, the present disclosure is not limited thereto, and any suitable conductive material used in the art may be used. The conductive material may be, for example, a carbonaceous conductive material.

As the dry binder, a vinylidene fluoride/hexafluoropropylene copolymer, polyvinylidene fluoride, polyacrylonitrile, polymethyl methacrylate, polytetrafluoroethylene (PTFE), a mixture of these polymers, and/or styrene butadiene rubber-based polymer may be used. As the solvent, N-methylpyrrolidone (NMP), acetone, or water may be used. However, the present disclosure is not limited thereto, and any solvent used in the art may be used.

A plasticizer or a pore-forming agent may be further added to the second composition so as to form pores in an electrode.

The amounts of the electrode active material, the dry conductive material, and the dry binder used in the second composition may be at any suitable levels generally used in lithium batteries.

The cathode uses a cathode active material as the electrode active material. For the cathode active material, the description of the electrode provided above may be referred to. The anode uses an anode active material as the electrode active material. For the anode active material, the description of the electrode provided above may be referred to.

Next, a first electrode active material layer is arranged on one surface or two surfaces of the electrode current collector by coating and drying the first composition thereon. In other embodiments, after the first composition is coated and dried on a separate substrate to form a sheet, the sheet may be separated from the substrate and on the electrode current collector. Next, a second electrode active material layer is arranged on the first electrode active material layer. For example, a sheet of the second composition in the form of a self-standing film may be arranged on the first electrode active material layer.

Next, an electrode is manufactured by pressing a laminate in which the electrode current collector, the first electrode active material layer, and the second electrode active material layer are arranged. The pressure during the pressing may be selected from a pressure range that is applied in an electrode manufacturing process of the related art.

For example, the first composition, and the second composition in a sheet form may be sequentially or simultaneously arranged on one surface of the electrode current collector, and then pressed to manufacture an electrode of a structure as shown in FIG. 4.

For example, the first composition, and the second composition in a sheet form may be sequentially or simultaneously arranged on one surface of the electrode current collector, and then pressed to manufacture an electrode of a structure as shown in FIG. 4.

The pressing may be, for example, roll pressing, plate pressing, and/or the like, but embodiments are not limited thereto. A pressure during the pressing may be, for example, about 1.0 ton/cm to about 10.0 ton/cm, or about 1.0 ton/cm to about 4.0 ton/cm. When the pressure during the pressing is excessively increased, the electrode current collector may crack. When the pressure during the pressing is too low, the binding strength between the electrode current collector and the electrode active material layer may be weak.

The lithium battery may be manufactured by, for example, a following method provided as an example, but the present disclosure is not necessarily limited to this method, and variations are possible according to required or desired conditions.

First, one or both of the cathode and the anode may be manufactured according to the electrode manufacturing method described above. In other embodiments, when one electrode of the cathode or the anode is manufactured by the electrode manufacturing method described above, the other electrode may be manufactured by a wet manufacturing method. For example, the other electrode may be manufactured by preparing an electrode slurry including an electrode active material, a conductive material, a binder, and a solvent, coating the prepared electrode slurry on an electrode current collector, and drying the electrode slurry.

Next, a separator to be inserted between the cathode and the anode is prepared.

The separator may be any suitable separator that is generally used in lithium batteries. As the separator, for example, a separator having low resistance to the ion movement of an electrolyte and excellent electrolyte impregnating ability is used. The separator, which is selected from fiberglass, polyester, Teflon, polyethylene, polypropylene, polytetrafluoroethylene (PTFE), and a combination thereof, may be in the form of non-woven fabric and/or woven fabric. A lithium ion battery may use, for example, a separator that can be wound up, such as polyethylene, polypropylene, and/or the like, and a lithium ion polymer battery may use a separator which is excellent in terms of its ability to be impregnated with an organic electrolyte.

The separator may be manufactured by a following example method, but the present disclosure is not necessarily limited thereto, and adjustment is possible according to required or desired conditions.

First, a polymer resin, a filler, and a solvent are mixed to prepare a separator composition. The separator composition is directly coated on an electrode and dried to form a separator. In other embodiments, after the separator composition is cast on a support and dried to form a separator film, the separator film may be separated from the support and laminated on an electrode to form a separator.

The polymer used for manufacturing the separator is not particularly limited, and any suitable polymer used for a binder of an electrode may be used. For example, the polymer may be a vinylidene fluoride/hexafluoropropylene copolymer, polyvinylidene fluoride (PVDF), polyacrylonitrile, polymethyl methacrylate, or a mixture thereof.

Next, an electrolyte is prepared.

The electrolyte may be, for example, an organic liquid electrolyte. For example, the organic liquid electrolyte may be prepared by dissolving a lithium salt in an organic solvent.

The organic solvent may be any suitable organic solvent used in the art. The organic solvent may include, for example, propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, diethylene glycol, dimethyl ether, or a mixture thereof.

The lithium salt may be any suitable lithium salt used in the art. The lithium salt may be, for example, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), LiCl, LiI, or a mixture thereof.

In other embodiments, the electrolyte may be a solid electrolyte. The solid electrolyte may be, for example, boron oxide, lithium oxynitride, and/or the like, but is not limited thereto, and any suitable solid electrolyte used in the art may be used. The solid electrolyte may be formed on the anode by, for example, sputtering, and/or a separate solid electrolyte sheet may be stacked on the anode. The solid electrolyte may be, for example, an oxide-based solid electrolyte and/or a sulfide-based solid electrolyte.

Figure 11:
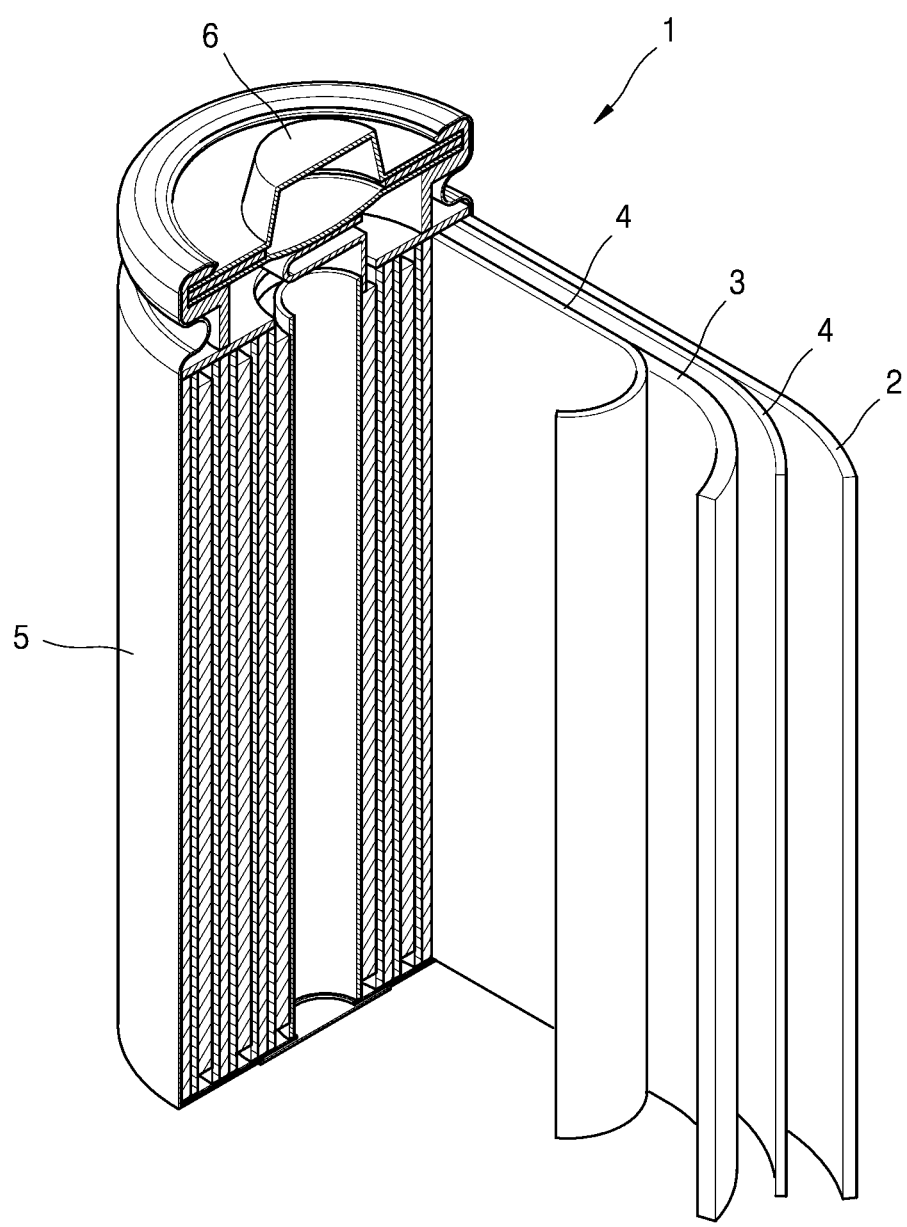
FIG. 11 is a perspective schematic view of a lithium battery according to an embodiment.

Referring to FIG. 11, a lithium battery 1 includes a cathode 3, an anode 2, and a separator 4. The cathode 3, the anode 2, and the separator 4 may be wound up or folded and accommodated in a battery case 5. An organic liquid electrolyte is injected into the battery case 5 and sealed with a cap assembly 6 to complete the manufacture of the lithium battery 1. The battery case 5 may be cylindrical, but is not limited to this form, and may have, for example, a prismatic or thin-film form.

A pouch-type lithium battery includes one or more battery assemblies. The separator is arranged between the cathode and the anode to form a battery assembly. The battery assembly is stacked in a bi-cell structure and then impregnated with an organic liquid electrolyte. Then, the resulting structure is put into a pouch and sealed to complete the manufacture of a pouch-type lithium battery. For example, after the cathode, the separator, and the anode described above may be wound up or folded as an electrode assembly in a flat jelly roll form, the electrode assembly is accommodated in a pouch. Subsequently, an organic liquid electrolyte is injected into the pouch and sealed to complete the manufacture of an lithium battery.

The lithium battery may have improved lifespan characteristics and high-rate characteristics, and thus, may be used in an electric vehicle (EV), for example, in a hybrid vehicle such as a plug-in hybrid electric vehicle (PHEV). In addition, the lithium battery may be used in fields in which storage of a large amount of power is required or desired. For example, the lithium battery may be used in an electric bicycle and/or a power tool.

A plurality of lithium batteries may be stacked to form a battery module, and a plurality of battery modules form a battery pack. The battery pack may be used in any suitable device which utilizes or requires high capacity and high output, for example, in a laptop computer, a smart phone, an electric vehicle, and/or the like.

For example, a battery module may include a plurality of batteries and a frame for holding the batteries. For example, a battery pack may include a plurality of battery modules and a busbar which connect or couple the battery modules. The battery module and/or the battery pack may further include a cooling device.

A plurality of battery packs are controlled by a battery management system. The battery management system includes battery packs and a battery control device connected to or coupled to the battery packs.

One or more embodiments of the disclosure will now be described in more detail with reference to the following examples. However, these examples are only for illustrative purposes and are not intended to limit the scope of the one or more embodiments of the disclosure.

Manufacture of Lithium Battery (Half-Cell)

Example 1: Wet Layer Thickness of 20 μm and Dry Layer Thickness of 80 μm

Manufacture of Cathode

A mixture of $LiNi_{0.91}Co_{0.05}Al_{0.04}O_2$ (hereinafter, referred to as NCA91) as a first electrode active material layer, carbon black (Denka Black) as a carbon conductive material, and polyvinylidene fluoride (PVdF) were mixed to a weight ratio of 96:1.8:2.2 with N-methylpyrrolidone (NMP) with an agate mortar to prepare a slurry (first composition). The slurry was bar-coated on a surface of an aluminum foil cathode current collector of a thickness of 12 μm and dried at room temperature, and dried again in a vacuum condition at 120° C. to introduce a first cathode active material layer.

$LiNi_{0.91}Co_{0.05}Al_{0.04}O_2$ (hereinafter, referred to as NCA91) as a second electrode active material, carbon black (Denka Black) as a carbon conductive material, and polytetrafluoroethylene (PTFE) were dry-mixed to a weight ratio of 96:1.8:2.2 to prepare a second composition. A solvent was not used in the preparation of the second composition. The prepared second composition was put into an extruder and extruded to prepare a second electrode active material layer as a self-standing film in a sheet form. A pressure during the extrusion was 20-50 MPa.

The second electrode active material layer as a self-standing film was arranged on the first cathode active material layer to prepare a laminate, and the prepared laminate was pressed to manufacture a cathode. A pressure during the pressing was 2.0-6.0 MPa.

The thickness of the first cathode active material layer was 20 μm, and the thickness of the second electrode active material layer was 80 μm.

Manufacture of Coin Cell

Using the cathode prepared above, a coin cell was manufactured, in which lithium metal as a counter electrode, a PTFE separator, and an electrolyte as a solution of 1.3 M $LiPF_6$ dissolved in a 3:4:4 (by volume) mixture of ethylene carbonate (EC), ethylmethylcarbonate (EMC), and dimethyl carbonate (DMC) were used.

Example 2: Wet Layer Thickness of 30 μm and Dry Layer Thickness of 70 μm

A cathode and a coin cell were manufactured in substantially the same manner as in Example 1, except that the thickness of the first cathode active material layer was changed to 30 µm and the thickness of the second cathode active material layer was changed to 70 µm.

Example 3: Wet Layer Thickness of 40 µm and Dry Layer Thickness of 60 µm

A cathode and a coin cell were manufactured in substantially the same manner as in Example 1, except that the thickness of the first cathode active material layer was changed to 40 µm and the thickness of the second cathode active material layer was changed to 60 µm.

Example 4: Wet Layer Thickness of 50 µm and Dry Layer Thickness of 50 µm

A cathode and a coin cell were manufactured in substantially the same manner as in Example 1, except that the thickness of the first cathode active material layer was changed to 50 µm and the thickness of the second cathode active material layer was changed to 50 µm.

Example 5: Wet Layer Thickness of 60 µm and Dry Layer Thickness of 40 µm

A cathode and a coin cell were manufactured in substantially the same manner as in Example 1, except that the thickness of the first cathode active material layer was changed to 50 µm and the thickness of the second cathode active material layer was changed to 50 µm.

Example 6: Mesh Current Collector

A cathode and a coin cell were manufactured in substantially the same manner as in Example 1, except that an aluminum mesh sheet instead of the aluminum foil was used as the cathode current collector.

Example 7: Arrangement of Cathode Material Layer on Two Surfaces of Cathode Current Collector A cathode and a coin cell were manufactured in substantially the same manner as in Example 1, except that after the arrangement of the first cathode active material layer on the two surfaces of the cathode current collector, the second cathode active material layer was additionally arranged on the first cathode active material layer on each of the two surfaces.

Comparative Example 1: Cathode Having Only Wet Layer

Manufacture of Cathode

A mixture of $LiNi_{0.91}Co_{0.05}Al_{0.04}O_2$ (hereinafter, referred to as NCA91) as a first electrode active material layer, carbon black (Denka Black) as a carbon conductive material, and polyvinylidene fluoride (PVdF) were mixed to a weight ratio of 96:1.8:2.2 with N-methylpyrrolidone (NMP) with an agate mortar to prepare a slurry (first composition). The slurry was bar-coated on a surface of an aluminum foil cathode current collector of a thickness of 12 µm and dried at room temperature, and dried again in a vacuum condition at 120° C. to introduce a first cathode active material layer, thereby preparing a laminate.

The prepared laminate was pressed to manufacture a cathode. A pressure during the pressing was 4.0 ton/cm. The thickness of the first cathode active material layer of the cathode of Comparative Example 1 was the same as the total thickness of the first cathode active material layer and the second cathode active material layer of the cathode of Example 1.

Manufacture of Coin Cell

A coin cell was manufactured in substantially the same manner as in Example 1, except that the cathode manufactured above was used.

Comparative Example 2: Cathode Having Only Dry Layer $LiNi_{0.91}Co_{0.05}Al_{0.04}O_2$ (hereinafter, referred to as NCA91) as a second cathode active material, carbon black (Denka Black) as a carbon conductive material, and polytetrafluoroethylene (PTFE) were dry-mixed to a weight ratio of 96:1.8:2.2 to prepare a second composition. A solvent was not used in the preparation of the second composition. The prepared second composition was put into an extruder and extruded to prepare a self-standing film of a second cathode active material layer in a sheet form. A pressure during the extrusion was 20-50 MPa.

The second cathode active material layer as a self-standing film was arranged on an aluminum foil cathode current collector of a thickness of 12 µm to prepare a laminate, and the prepared laminate was pressed to manufacture a cathode. A pressure during the pressing was 2.0-6.0 ton/cm.

The thickness of the second cathode active material layer of the cathode of Comparative Example 2 was the same as the total thickness of the first cathode active material layer and the second cathode active material layer of the cathode of Example 1.

In the manufactured cathode, part of the second cathode active material layer was delaminated from the cathode current collector, and thus, it was impossible to manufacture a coin cell.

Evaluation Example 1: Evaluation of Vertical Force of Cathode Active Material Layer (I)

Binding characteristics of the cathode active material layer included in the cathodes manufactured in Examples 1 to 7 and Comparative Example 1 were analyzed using a SAICAS (SAICAS EN-EX, Daipla Wintes, JAPAN).

The vertical force ($F_V$) according to depth was measured by performing constant velocity analysis by using a boron nitride blade of a width of 1 mm in the conditions of a clearance angle of 10°, a rake angle of 20°, a shear angle of 45°, a horizontal velocity of 4 µm/s, and a vertical velocity of 0.4 µm/s.

In the case of Examples 1 to 7, first constant velocity analysis was performed first, in which from a first position on the surface of the second cathode active material layer, sequentially passing through the second cathode active material layer and the first cathode active material layer, to the surface of the cathode current collector, and then, the blade was horizontally moved along the surface of the cathode current collector to remove the cathode active material layer. Then, at a position 10 µm backward from the first position, second constant velocity analysis was performed in the same conditions as in the first constant velocity analysis. Data measured in the second constant velocity analysis was used. For Comparative Example 1, measurement was performed on the first cathode active material layer in the same manner as for the examples. For Comparative Example 2, measurement was not possible or feasible.

A vertical force of the second cathode active material layer was measured from a section of the second cathode active material layer, and the measured data was normalized using a force graph area to derive a vertical relative force ($F_{VR}$) of the second cathode active material layer. The derived results are represented in FIG. 1.

A vertical force of the first cathode active material layer was measured from a section of the first cathode active material layer, and the measured data was normalized with a force graph area to derive a vertical relative force ($F_{VR}$) of the first cathode active material layer. The derived results are represented in FIG. 1.

To calculate a ratio of change of vertical relative force, the vertical relative force of the second cathode active material layer was measured using data derived from a section starting from a third point ending at a fourth point, wherein the third point is 5% away (third distance 5% away) from a surface of the second cathode active material layer facing away from a surface of the first electrode active material layer, and the fourth point is 5% away (fourth distance 5% away) from the surface of the first cathode active material layer with respect to the total thickness of the second cathode active material layer. To calculate a ratio of change of vertical relative force, the vertical relative force of the first cathode active material layer was measured using data derived from a section starting from a first point ending at a second point, wherein the first point is 5% away (first distance 5% away) from a surface of the first cathode active material layer facing away from a surface of the electrode current collector, and the second point is 5% away (second distance 5% away) from the surface of the electrode current collector with respect to the total thickness of the first cathode active material layer.

In FIG. 1, when calculating ratios of change of vertical relative force, vertical relative force data near the surface of the second cathode active material layer, the interface between the second cathode active material layer and the first cathode active material layer (e.g., one surface of the first cathode active material layer), and the surface of the electrode current collector were excluded to prevent or reduce a measurement error.

From the vertical relative force ($F_{VR}$) data of the second cathode material layer in the section from the third point to the fourth point, a ratio of change of vertical relative force ($F_{VR}$) of the second cathode active material layer was calculated using Equation 1. The same calculation was performed on the first cathode active material layer in the section from the first point to the second point. The ratio of change of vertical relative force ($F_{VR}$) of the second cathode active material layer was defined as a second ratio of change, and the ratio of change of vertical relative force ($F_{VR}$) of the first cathode active material layer was defined as a first ratio of change.

In the case of Comparative Example 1 having a single layer structure, the vertical relative force of the first cathode active material layer, when calculating a change ratio of vertical relative force, used was data measured from a section starting from a fifth point ending at a sixth point, wherein the fifth point is 5% away (fifth distance 5% away) from the surface of the first cathode active material layer facing away from the cathode current collector, and the sixth point is 5% away (sixth distance 5% away) from the surface of the cathode current collector with respect to the total thickness of the first cathode active material layer.

The first ratios of change of the first cathode active material layer and the second ratios of change of the second cathode active material layer are represented in Table 1.

Ratio of change of vertical relative force ($F_{VR}$)= [(Maximum value of vertical relative force− Minimum value of vertical relative force)/Minimum value of vertical relative force]×100     Equation 1

In addition, an arithmetic mean value of the vertical relative force ($F_{VR}$) data of the second cathode active material layer in the section starting from the third point ending at the fourth point was calculated. The same calculation was performed on the first cathode active material layer in the section starting from the first point ending at the second point. An arithmetic mean value of the vertical relative force ($F_{VR}$) of the second cathode active material layer in the selected section was defined as a second mean value. Likewise, an arithmetic mean value of the vertical relative force ($F_{VR}$) of the first cathode active material layer was defined as a first mean value.

TABLE 1

|  | First change ratio [%] | Second change ratio [%] |
| --- | --- | --- |
| Comparative Example 1 | 600 | — |
| Example 1 | 150 | 180 |

As shown in Table 1 and Table 1, the ratio of change (first ratio of change) of vertical relative force of the first cathode active material layer included in the cathode of Comparative Example 1 to 3 was greater than 300%.

Meanwhile, the ratio of change of vertical relative force of the second cathode active material layer included in the cathode of Example 1 was 200% or less.

In addition, the ratio of change of vertical relative force of the first cathode active material layer included in the cathode of Example 1 was 200% or less.

The reduction in the ratio of change of vertical relative force was attributed to the reduced thickness of the first cathode active material layer included in the cathode of Example 1 compared to that of the first cathode active material layer included in the cathode of Comparative Example 1.

As shown in FIG. 1, a first mean value of the first cathode active material layer (i.e., a mean value of the vertical relative force in the section from a depth of 4 μm to 76 μm) included in the cathode of Example 1 was smaller than a second mean value of the second cathode active material layer (i.e., a mean value of the vertical relative force in the section from a depth of 81 μm to 99 μm). The first mean value was about 0.01, and the second mean value was about 0.02.

Accordingly, it was confirmed that uniformities of binding force and compositional distribution according to location along the thickness direction were improved in the cathode of Example 1 compared to the cathode of Comparative Example 1.

Evaluation Example 2: Evaluation of Horizontal Force of Cathode Active Material Layer (II)

Binding characteristics of the cathode active material layer included in the cathodes manufactured in Example 1 and Comparative Example 1 were analyzed using a SAICAS (SAICAS EN-EX, Daipla Wintes, JAPAN).

The horizontal force (FH) according to depth was measured by performing constant velocity analysis by using a boron nitride blade of a width of 1 mm in the conditions of a clearance angle of 10°, a rake angle of 20°, a shear angle of 45°, a horizontal velocity of 4 µm/s, and a vertical velocity of 0.4 µm/s.

In the case of Examples 1 to 7, first constant velocity analysis was performed first, in which from a first position on the surface of the second cathode active material layer, sequentially passing through the second cathode active material layer and the first cathode active material layer, to the surface of the cathode current collector, and then, the blade was horizontally moved along the surface of the cathode current collector to remove the cathode active material layer. Then, at a position 10 µm backward from the first position, second constant velocity analysis was performed in the same conditions as in the first constant velocity analysis. Data measured in the second constant velocity analysis was used. For Comparative Example 1, measurement was performed on the first cathode active material layer in the same manner as for the examples. For Comparative Example 2, measurement was not possible or feasible.

In the case of Example 1 to 7, measured were: a first horizontal force ($F_{HA1}$) at a first point, which is 10% away (fifth point 10% away) from one surface of the second cathode active material layer (i.e., the surface of the second cathode active material layer) facing away from the other surface of the second cathode active material layer (i.e., the interface between the first cathode active material layer and the second cathode active material layer); and a second horizontal force ($F_{HA2}$) at a second point, which is 10% away (sixth point 10% away) from the other surface of the second cathode active material layer (i.e., the interface between the first cathode active material layer and the second cathode active material layer) with respect to the total thickness of the second cathode active material layer.

In the case of Comparative Example 1, a first horizontal force ($F_{H1}$) at a first point, which is 10% away from the surface of the first cathode active material layer facing away from the cathode current collector, and a second horizontal force ($F_{H2}$) at a second point, which is 10% away from the surface of the cathode current collector with respect to the total thickness of the first cathode active material layer.

Some of the horizontal force evaluation results are represented in Table 2. A horizontal force ratio of the first point and second point is defined by Equation 2.

Horizontal force ratio of first point and second point (%)=[$F_{HA2}/F_{HA1}$]×100    Equation 2

TABLE 2

| | Horizontal force ratio [%] |
|---|---|
| Comparative Example 1 | 45 |
| Example 1 | 75 |

As shown in Table 2, the horizontal force ratio of the first point and the second point for the second cathode active material layer of Example 1 was remarkably higher than that for the first cathode active material layer of Comparative Example 1.

Accordingly, it was confirmed that the binding force and compositional distribution were more uniform in the second cathode active material layer of Example 1 than in the first cathode active material layer of Comparative Example 1.

Evaluation Example 3: Room Temperature Charge/Discharge Characteristic Evaluation The lithium batteries manufactured in Examples 1 to 8 and Comparative Example 1 were charged with a constant current of 0.1 C rate at 25° C. until a voltage reached 4.4 V (vs. Li), and maintained at 4.4 V in a constant voltage mode and then cut off at a current of 0.05 C rate. Subsequently, during discharging, the lithium batteries were discharged with a constant current of 0.1 C rate until the voltage reached 2.8 V (vs. Li) (formation cycle).

The lithium batteries, which had undergone the formation cycle, were charged with a constant current of 0.5 C rate at 25° C. until the voltage reached 4.4 V (vs. Li). Subsequently, during discharging, the lithium batteries were charged with a constant current of 0.5 C rate until the voltage reached 2.8 V (vs. Li). This cycle was repeated in the same conditions up to the 100th cycle (repeated 100 times).

Through all of the charge/discharge cycles, there was a pause of 10 minutes after each charge/discharge cycle. Some results of the room temperature charge/discharge test are shown in Table 5. The capacity retention ratio at the 100th cycle is defined by Equation 1.

Capacity retention ratio [%]=[Discharge capacity at $100^{th}$ cycle/Discharge capacity at $1^{st}$ cycle]×100    Equation 1

TABLE 3

| | Capacity retention ratio [%] |
|---|---|
| Example 1 | 83.8 |
| Example 2 | 82.6 |
| Example 3 | 80.4 |
| Example 4 | 77.2 |
| Example 5 | 75.1 |
| Comparative Example 1 | 64.8 |

As shown in Table 3, the lithium batteries of Examples 1 to 5 had improved room-temperature lifespan characteristics compared to the lithium battery of Comparative Example 1.

Evaluation Example 4: Room Temperature High-Rate Capability Evaluation

The lithium batteries manufactured in Examples 1 to 7 and Comparative Examples 1 to 3 were charged with a constant current of 0.1 C rate at 25° C. until a voltage reached 4.4 V (vs. Li), and maintained at 4.4 V in a constant voltage mode and then cut off at a current of 0.05 C rate. Subsequently, during discharging, the lithium batteries were discharged with a constant current of 0.1 C rate until the voltage reached 2.8 V (vs. Li) (formation cycle).

The lithium batteries, which had undergone the formation cycle, were charged with a constant current of 0.2 C rate at 25° C. until the voltage reached 4.4 V (vs. Li). Subsequently, during discharging, the lithium batteries were discharged with a constant current of 0.2 C rate until the voltage reached 2.8 V (vs. Li) ($1^{st}$ cycle).

The lithium batteries, which had undergone the first cycle, were charged with a constant current of 0.2 C rate at 25° C. until the voltage reached 4.4 V (vs. Li). Subsequently, during discharging, the lithium batteries were discharged with a constant current of 0.33 C rate until the voltage reached 2.8 V (vs. Li) ($2^{nd}$ cycle).

The lithium batteries, which had undergone the second cycle, were charged with a constant current of 0.2 C rate at 25° C. until the voltage reached 4.4 V (vs. Li). Subsequently, during discharging, the lithium batteries were discharged with a constant current of 0.5 C rate until the voltage reached 2.8 V (vs. Li) (3$^{rd}$ cycle).

The lithium batteries, which had undergone the third cycle, were charged with a constant current of 0.2 C rate at 25° C. until the voltage reached 4.4 V (vs. Li). Subsequently, during discharging, the lithium batteries were discharged with a constant current of 1.0 C rate until the voltage reached 2.8 V (vs. Li) (4$^{th}$ cycle).

The lithium batteries, which had undergone the fourth cycle, were charged with a constant current of 0.2 C rate at 25° C. until the voltage reached 4.4 V (vs. Li). Subsequently, during discharging, the lithium batteries were discharged with a constant current of 2.0 C rate until the voltage reached 2.8 V (vs. Li) (5$^{th}$ cycle).

The lithium batteries, which had undergone the fifth cycle, were charged with a constant current of 0.2 C rate at 25° C. until the voltage reached 4.4 V (vs. Li). Subsequently, during discharging, the lithium batteries were discharged with a constant current of 3.0 C rate until the voltage reached 2.8 V (vs. Li) (6$^{th}$ cycle).

Figure 2:
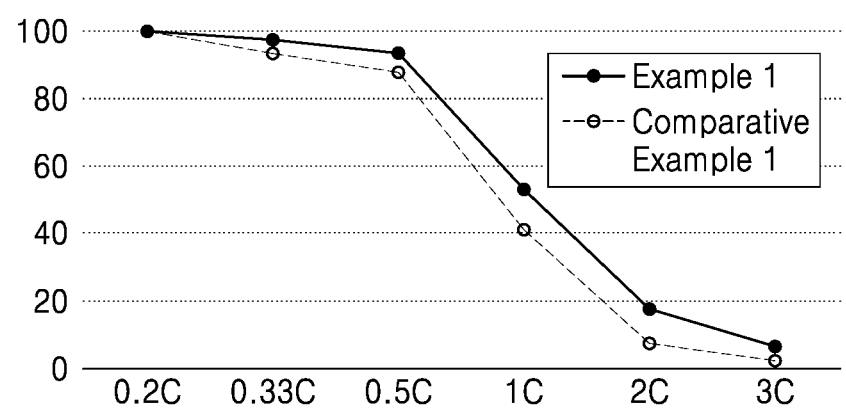
FIG. 2 shows graphs of high-rate capabilities of lithium batteries manufactured in Example 1 and Comparative Example 1.

Through all of the charge/discharge cycles, there was a pause of 10 minutes after each charge/discharge cycle. Some results of the room temperature charge/discharge test are shown in FIG. 2 and Table 4. The high-rate capability is defined by Equation 2.

High-rate capability [%]=[Discharge capacity at 5$^{th}$ cycle/Discharge capacity at 1$^{st}$ cycle]×100    Equation 2

TABLE 4

|  | High-rate capability (2 C/0.2 C) [%] |
| --- | --- |
| Example 1 | 19.4 |
| Example 2 | 18.6 |
| Example 3 | 17.4 |
| Example 4 | 15.4 |
| Example 5 | 13.1 |
| Comparative Example 1 | 8.9 |

As shown in Table 4 and FIG. 2, the lithium batteries of Examples 1 to 5 had improved high-rate capabilities compared to the lithium battery of Comparative Example 1.

According to one aspect of embodiments of the present disclosure, because an electrode has uniform (e.g., substantially uniform) distribution of components, high-rate capability of a lithium battery including the electrode is improved.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims, and equivalents thereof.

What is claimed is:

1. An electrode comprising:
    an electrode active material layer comprising an electrode active material and a binder; and
    an electrode current collector on one surface or between two surfaces of the electrode active material layer; and
    wherein the electrode active material layer includes: a first electrode active material layer including a first electrode active material and a first binder and contacting the electrode current collector; and a second electrode active material layer on the first electrode active material layer and comprising a second electrode active material layer and a second binder,
    wherein the first electrode active material layer has, as measured by a surface and interfacial cutting analysis system (SAICAS), a first ratio of change of vertical relative force ($F_{VR}$) between a first point, which is 5% away from a surface of the first electrode active material layer facing away from the electrode current collector, and a second point, which is 5% away from a surface of the electrode current collector with respect to a total thickness of the first electrode active material layer,
    the second electrode active material layer has, as measured by the SAICAS, a second ratio of change of vertical relative force ($F_{VR}$) between a third point, which is 5% away from a surface of the second electrode active material layer facing away from the first electrode active material layer, and a fourth point, which is 5% away from the surface of the first electrode active material layer with respect to the total thickness of the second electrode active material layer, and
    the first ratio of change of the first electrode active material layer differs from the second ratio of change of the second electrode active material layer, and the second ratio of change of the second electrode active material layer is 300% or less.

2. The electrode of claim 1, wherein the first ratio of change of the first electrode active material layer is 300% or less.

3. The electrode of claim 1, wherein the first electrode active material layer has, as measured by the SAICAS, a first mean value of vertical relative force ($F_{VR}$) between the first point, which is 5% away from the surface of the first electrode active material layer facing away from the electrode current collector, and the second point, which is 5% away from the surface of the electrode current collector with respect to the total thickness of the first electrode active material layer,
    the second electrode active material layer has, as measured by the SAICAS, a second mean value of vertical relative force ($F_{VR}$) between the third point, which is 5% away from the surface of the second electrode active material layer facing away from the first electrode active material layer, and the fourth point, which is 5% away from the surface of the first electrode active material layer with respect to the total thickness of the second electrode active material layer, and
    the first mean value of vertical relative force ($F_{VR}$) of the first electrode active material layer is smaller than the second mean value of vertical relative force ($F_{VR}$) of the second electrode active material layer.

4. The electrode of claim 1, wherein a thickness of the first electrode active material layer is about 1% to about 60% of the total thickness of the electrode active material layer, and a thickness of the second electrode active material layer may be about 40% to about 99% of the total thickness of the electrode active material layer.

5. The electrode of claim 1, wherein the first electrode active material layer is a dried product of a composition comprising a process solvent.

6. The electrode of claim 1, wherein the first electrode active material layer and the second electrode active material layer comprise a same electrode active material.

7. The electrode of claim 1, wherein a porosity of the first electrode active material layer is about 10% to about 95% of a porosity of the second electrode active material layer.

8. The electrode of claim 1, wherein the second binder is a dry binder, the dry binder comprises a fibrillized binder, and the dry binder comprises a fluorine-based binder.

9. The electrode of claim 1, wherein the second electrode active material layer further comprises a conductive material, the conductive material is a dry conductive material, and the dry conductive material comprises a carbonaceous conductive material.

10. The electrode of claim 1, wherein the second electrode active material layer is a self-standing film, and the second electrode active material layer is free of a residual process solvent.

11. The electrode of claim 1, wherein the electrode current collector has a form selected from a sheet, a foil, a film, a plate, a porous body, a mesoporous body, a through-hole-containing body, a polygonal ring body, a mesh body, a foam, and a non-woven body.

12. The electrode of claim 1, wherein the electrode active material layer comprises: a first surface; a second surface that is opposite to the first surface;
a first side surface coupled to lengthwise ends of the first surface and the second surface; a second side surface that is opposite to the first side surface;
a third side surface coupled to widthwise ends of the first surface and the second surface; and a fourth side surface that is opposite to the third side surface,
the electrode active material layer has a first area defined by a first lengthwise distance and a first widthwise distance thereof,
the electrode current collector is between the first surface and the second surface,
the electrode current collector has a second area defined by a second lengthwise distance and a second widthwise distance thereof, and
the second area of the electrode current collector is less than 100% of the first area of the electrode active material layer.

13. The electrode of claim 12, wherein the second lengthwise distance of the electrode current collector is less than 100% of the first lengthwise distance of the electrode active material layer, or
the second widthwise distance of the electrode current collector is less than 100% of the first widthwise distance of the electrode active material layer, or
the second lengthwise distance of the electrode current collector is less than 100% of the first lengthwise distance of the electrode active material layer, and the second widthwise distance of the electrode current collector is less than 100% of the first widthwise distance of the electrode active material layer.

14. The electrode of claim 12, wherein the electrode current collector is exposed through three or fewer side surfaces from among the first side surface, the second side surface, the third side surface, and the fourth side surface, and
the electrode current collector further comprises a tab extending to the outside of the electrode active material layer through two or fewer side surfaces selected from the first side surface, the second side surface, the third side surface, and the fourth side surface.

15. The electrode of claim 12, comprising a plurality of electrode current collectors arranged spaced apart along a length direction or width direction of the electrode active material layer, and
the plurality of electrode current collectors are arranged to form an angle of 45 degrees or less with one or more of the first surface and the second surface of the electrode active material layer.

16. The electrode of claim 12, wherein the electrode active material layer comprises:
a first region which is between the first surface and the second surface and in which the electrode current collector is located; and
a second region which is between the first surface and the second surface and is free of the electrode current collector, and
a mixture density of the second region is less than 100% of that of the first region.

17. A lithium battery comprising:
a cathode;
an anode; and
an electrolyte between the cathode and the anode, wherein:
one or more selected from the cathode and the anode is the electrode according to claim 1.

18. The lithium battery of claim 17, wherein the lithium battery is selected from a lithium-ion battery and a lithium solid battery.

19. The lithium battery of claim 17, comprising an electrode assembly comprising:
a plurality of cathodes stacked along a thickness direction of the lithium battery;
a plurality of anodes each between the plurality of cathodes; and
a plurality of electrolytes each between the plurality of cathodes and the plurality of anodes, wherein:
the cathode comprises a cathode current collector, and the cathode current collector comprises a cathode tab extending to the outside of the cathode active material layer through one side surface of the electrode assembly, and
the anode comprises an anode current collector, and the anode current collector comprises an anode tab extending to the outside of the anode active material layer through the one side surface, or through another side surface that is opposite to the one side surface, of the electrode assembly.

\* \* \* \* \*